(12) United States Patent
Dudley et al.

(10) Patent No.: US 11,360,231 B2
(45) Date of Patent: *Jun. 14, 2022

(54) MARINE VESSEL FOR SEISMIC SOURCES

(71) Applicant: ION Geophysical Corporation, Houston, TX (US)

(72) Inventors: Timothy A. Dudley, Houston, TX (US); Curt Schneider, Richmond, TX (US)

(73) Assignee: ION Geophysical Corporation, Houston, TX (US)

( * ) Notice: Subject to any disclaimer, the term of this patent is extended or adjusted under 35 U.S.C. 154(b) by 525 days.

This patent is subject to a terminal disclaimer.

(21) Appl. No.: 16/245,999

(22) Filed: Jan. 11, 2019

(65) Prior Publication Data

US 2019/0146113 A1 May 16, 2019

Related U.S. Application Data

(63) Continuation of application No. 15/482,175, filed on Apr. 7, 2017, now Pat. No. 10,254,423.

(60) Provisional application No. 62/319,598, filed on Apr. 7, 2016.

(51) Int. Cl.
| | |
|---|---|
| *G01V 1/38* | (2006.01) |
| *B63B 21/66* | (2006.01) |
| *G05D 1/02* | (2020.01) |
| *B63B 27/36* | (2006.01) |

(52) U.S. Cl.
CPC ............ *G01V 1/3843* (2013.01); *B63B 21/66* (2013.01); *G01V 1/3808* (2013.01); *G01V 1/3861* (2013.01); *G05D 1/0206* (2013.01); *B63B 27/36* (2013.01); *G01V 1/3826* (2013.01); *G01V 1/3835* (2013.01)

(58) Field of Classification Search
CPC .. G01V 1/3843; G01V 1/3808; G01V 1/3861; B63B 21/66; G05D 1/0206
See application file for complete search history.

(56) References Cited

U.S. PATENT DOCUMENTS

| | | | |
|---|---|---|---|
| 4,658,384 A | 4/1987 | Dragoset et al. | |
| 4,715,023 A | 12/1987 | Otto | |
| 5,432,757 A | 7/1995 | Chelminski | |

(Continued)

FOREIGN PATENT DOCUMENTS

| | | |
|---|---|---|
| WO | 9934238 A1 | 7/1999 |
| WO | 0067046 A1 | 11/2000 |

(Continued)

OTHER PUBLICATIONS

International Search Report and Written Opinion dated Dec. 21, 2017 in connection with International Patent Application No. PCT/US2017/026611, 12 pages.

(Continued)

*Primary Examiner* — Ian J Lobo
(74) *Attorney, Agent, or Firm* — Patterson + Sheridan, LLP

(57) ABSTRACT

A vessel system includes a hull configured to provide buoyancy, one or more seismic sources configured to generate seismic energy, and a deployment apparatus configured to deploy the seismic sources from the hull to a water body or water column. A control system can be configured to operate the deployment apparatus, in order to deploy the seismic sources.

23 Claims, 20 Drawing Sheets

(56) References Cited

U.S. PATENT DOCUMENTS

| | | | |
|---|---|---|---|
| 6,028,817 | A | 2/2000 | Ambs et al. |
| 6,285,956 | B1 | 9/2001 | Bennett et al. |
| 6,590,831 | B1 | 7/2003 | Bennett et al. |
| 6,606,958 | B1 | 8/2003 | Bouyoucos |
| 6,779,475 | B1 | 8/2004 | Crane et al. |
| 6,870,795 | B2 * | 3/2005 | Bouyoucos ............ G01V 1/006 367/144 |
| 7,954,442 | B2 | 6/2011 | Stottlemyer et al. |
| 8,075,226 | B2 | 12/2011 | Fyffe et al. |
| 8,477,561 | B2 | 7/2013 | Singh et al. |
| 8,824,239 | B2 | 9/2014 | Welker et al. |
| 9,013,952 | B2 | 4/2015 | Combee et al. |
| 9,400,338 | B2 | 7/2016 | Coste et al. |
| 10,005,523 | B2 | 6/2018 | Dudley |
| 10,254,423 | B2 * | 4/2019 | Dudley ................... B63B 21/66 |
| 2004/0013041 | A1 | 1/2004 | Bouyoucos et al. |
| 2008/0267009 | A1 | 10/2008 | Frivik et al. |
| 2009/0316524 | A1 | 12/2009 | Tenghamn et al. |
| 2010/0054896 | A1 * | 3/2010 | Lababidy ................ B63B 21/66 414/137.7 |
| 2010/0170428 | A1 | 7/2010 | Toennessen |
| 2010/0275831 | A1 | 11/2010 | Stottlemyer et al. |
| 2012/0160143 | A1 | 6/2012 | Bailey |
| 2014/0177387 | A1 | 6/2014 | Brizard |
| 2014/0362661 | A1 | 12/2014 | Welker et al. |
| 2017/0203815 | A1 | 7/2017 | Dudley et al. |
| 2017/0293042 | A1 | 10/2017 | Schneider et al. |
| 2018/0346076 | A1 | 12/2018 | Dudley |

FOREIGN PATENT DOCUMENTS

| | | |
|---|---|---|
| WO | 01/73477 A3 | 10/2001 |
| WO | 03/086850 A2 | 10/2003 |
| WO | 2007006785 A2 | 1/2007 |
| WO | 2012041844 A1 | 4/2012 |
| WO | 2015/175646 A1 | 11/2015 |
| WO | 2015189415 A2 | 12/2015 |

OTHER PUBLICATIONS

Invitation to Pay Additional Fees and, Where Applicable, Protest Fee dated Apr. 3, 2017 in connection with International Patent Application No. PCT/US2017/014076, 10 pages.

The International Search Report and Written Opinion dated Jun. 12, 2017 in connection with International Patent Application No. PCT/US2017/014076, 20 pages.

Communication pursuant to Article 94(3) EPC dated Jul. 9, 2019 in connection with European Patent Application No. 17784422.2, 6 pages.

Office Action dated Aug. 22, 2019 in connection with Danish patent application No. PA201870676, 10 pages.

European Patent Office Examination Report for Application No. 17 784 422-2-1015 dated Jan. 10, 2020.

Danish Patent and Trademark Office 2nd Technical Examination for PA 2018 70676 dated May 14, 2020.

Mexican Institute of Industrail Property (IMPI) Office Action for Application No. MX/a/2018/012026 dated Jun. 24, 2021.

* cited by examiner

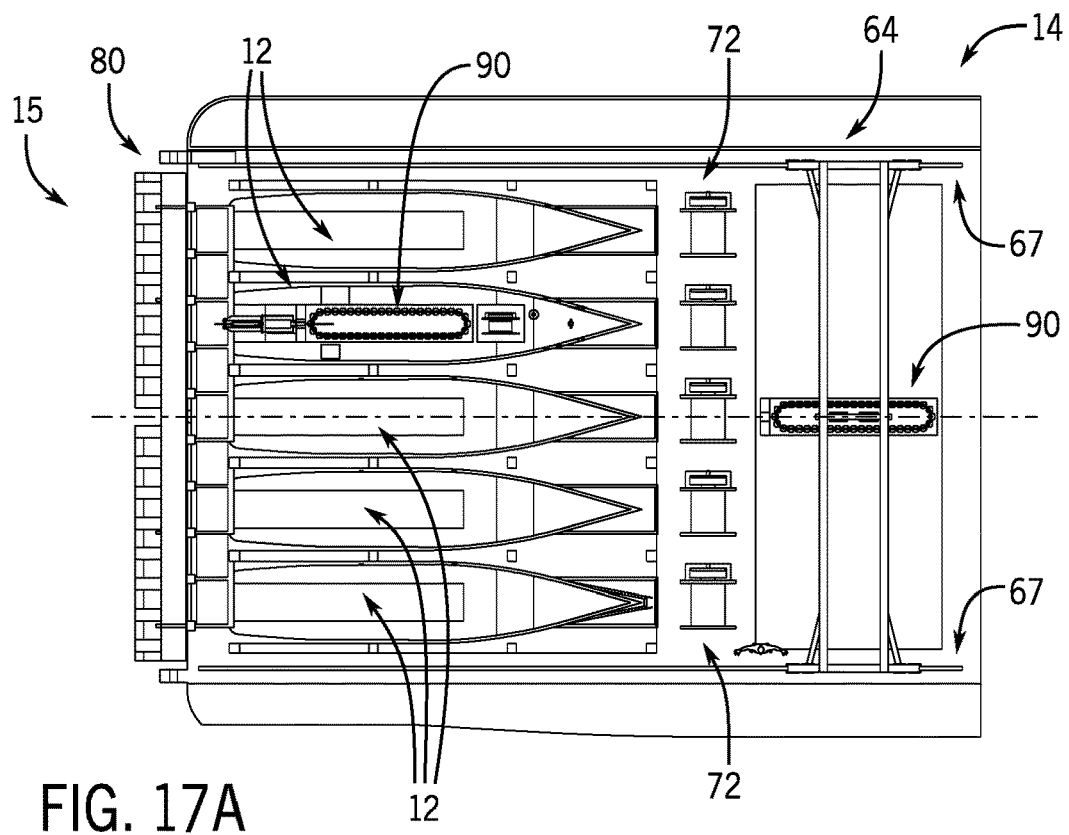
FIG. 17A
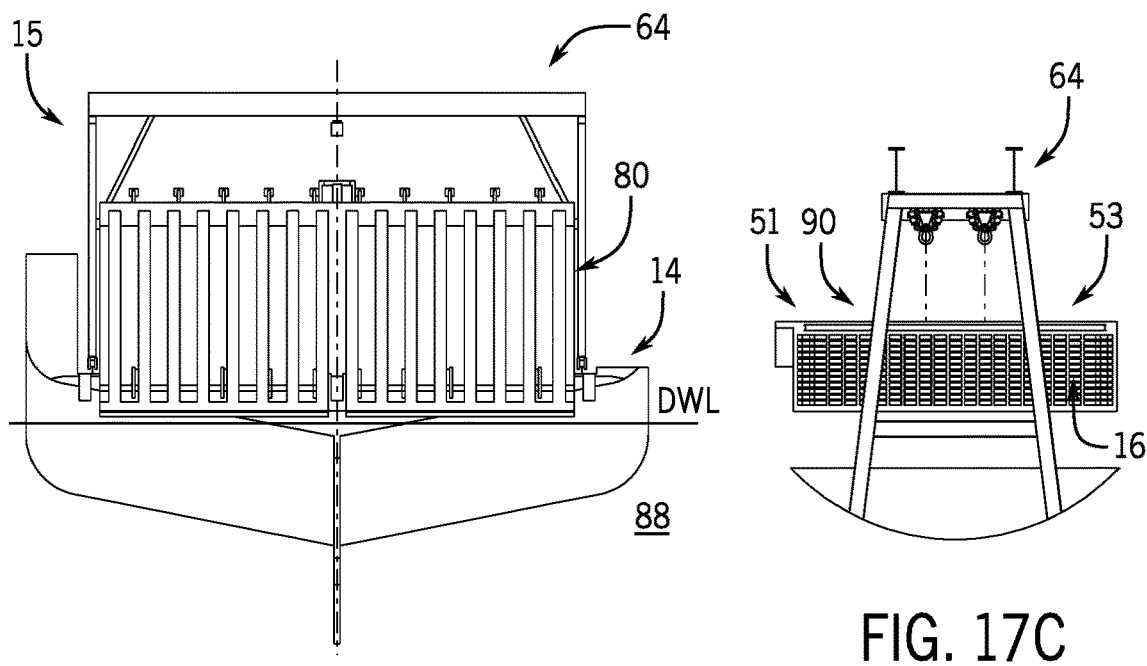
FIG. 17B
FIG. 17C

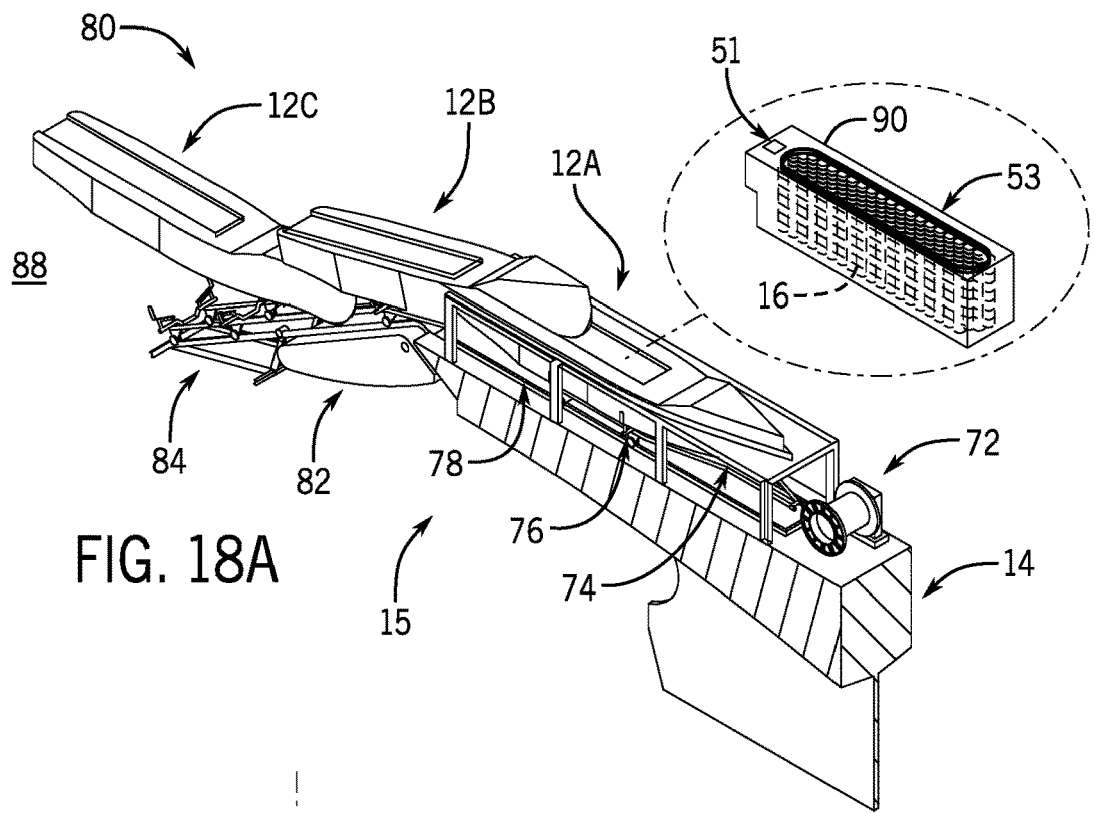
FIG. 18A
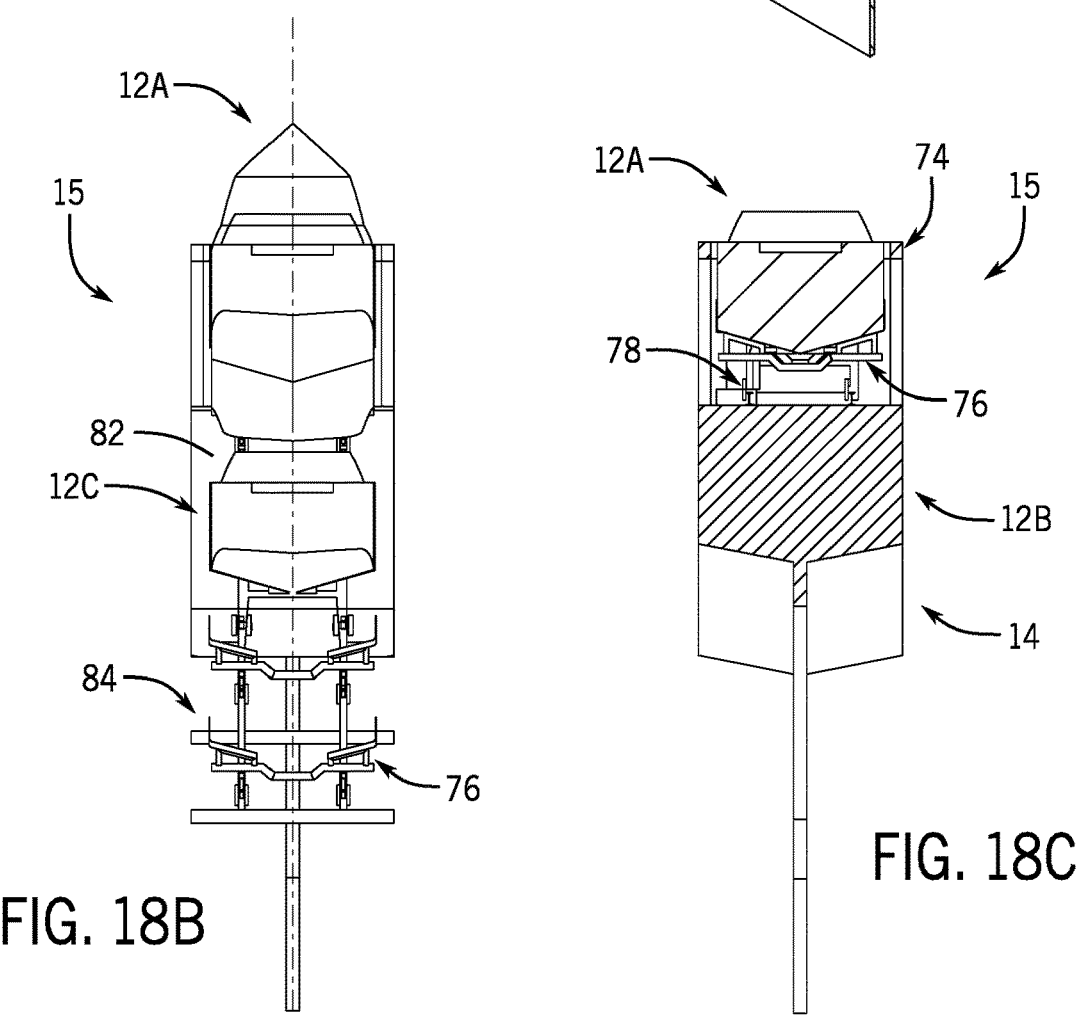
FIG. 18B
FIG. 18C

MARINE VESSEL FOR SEISMIC SOURCES

CROSS-REFERENCE TO RELATED APPLICATIONS

This application is a continuation of U.S. patent application Ser. No. 15/482,175, filed Apr. 7, 2017, entitled UNMANNED MARINE VESSEL FOR SEISMIC SOURCES, which claims priority to U.S. Provisional Application No. 62/319,598, filed Apr. 7, 2016, entitled UNMANNED MARINE VESSEL FOR SEISMIC SOURCES, each of which is incorporated by reference herein, in the entirety and for all purposes.

This application is related to U.S. Provisional Patent Application No. 62/280,659, filed Jan. 19, 2016, entitled UNMANNED MARINE VESSEL FOR NODE DEPLOYMENT AND RETRIEVAL, and U.S. patent application Ser. No. 15/410,038, filed Jan. 19, 2016, entitled UNMANNED MARINE VESSEL FOR NODE DEPLOYMENT AND RETRIEVAL, issued Jun. 26, 2018 as U.S. Pat. No. 10,005,523, each of which is incorporated by reference herein, in the entirety and for all purposes.

BACKGROUND

This disclosure relates to seismic surveys and seismic sources, including marine-based seismic source deployment. More generally, the disclosure encompasses deployment and retrieval technologies for marine-based seismic source systems, including, but not limited to, towed air gun arrays.

Traditional marine seismic surveys typically utilize a number of seismic source and receivers systems towed behind a seismic survey vessel, for example in the form of an air gun array and a towed seismic streamer array. Alternatively, a combination of seismic sources can be employed with one or more ocean bottom cables or autonomous node systems, e.g., as described in one or more of Gagliardi et al., U.S. Pat. No. 8,593,905, MARINE SEISMIC SURVEYING IN ICY OR OBSTRUCTED WATERS, issued Nov. 26, 2013; Lambert et al., U.S. Pat. No. 8,730,766, SEISMIC SYSTEM WITH GHOST AND MOTION REJECTION, issued May 20, 2014; Rigsby et al., U.S. Pat. No. 9,121,969, POWER SAVINGS MODE FOR OCEAN BOTTOM SEISMIC DATA ACQUISITION SYSTEMS, issued Sep. 1, 2015; Roberts et al., U.S. Pat. No. 9,354,343, DECLINATION COMPENSATION FOR SEISMIC SURVEY, issued May 31, 2016; and Gagliardi, et al., U.S. Pat. No. 9,535,182, MARINE SEISMIC SURVEYING WITH TOWED COMPONENTS BELOW WATER SURFACE, issued Jan. 3, 2017; each of which is incorporated by reference herein, in the entirety and for all purposes.

Seismic exploration techniques include controlling the emission of seismic energy directed into the Earth with a seismic source (e.g., dynamite, air guns, vibrators, etc.), and monitoring the Earth's response to the seismic energy with one or more nodes or receivers configured to detect reflected seismic waves, in order to create an image of the subsurface. In operation of a typical seismic survey, the air guns or other sources are used to generate seismic energy in the form of acoustic waves, which propagates down through the water column, penetrates the ocean floor or other bottom surface, and is reflected from the underlying subsurface structures. The reflected energy travels back up to the seismic streamers, nodes, or other seismic receivers, where it is detected by hydrophones, geophones and similar seismic sensor devices configured to generate seismic data responsive to the seismic waveforms. Scientists and engineers can then conduct seismic surveys based on the acquired sensor data, e.g., utilizing seismic inversion and other wave exploration techniques, in order to identify and map oil and gas reservoirs, salt and rock formations, and other subsurface structures of interest.

Conventional marine seismic surveys generally involve towing one or more seismic sources behind a seismic vessel, along with an array of seismic receivers or nodes. The seismic nodes can deployed along one or more ocean bottom cables, in the form of autonomous nodes disposed on the seabed, or deployed at a particular depth and orientation within the water column. Each receiver or node can include a number of different pressure and/or particle motion sensors in proximity to one another, for example using a hydrophone system that records scalar pressure measurements of the seismic wavefield and a geophone array that records three-dimensional vector velocity measurements of the corresponding particle motion. Geophysical data pertaining to the wavefield can then be acquired by observing the reflected seismic signals, and the signals can be processed to form an image indicating the composition and subsurface structure of the Earth near the survey location, as described above.

Deploying, towing and retrieving the seismic sources are complex tasks, limiting the number of conventional source configurations that can be used in a given survey area. As more air guns or other sources are added to the array, the associated high-pressure pneumatic connections and umbilical cabling also get longer and larger in diameter, increasing drag, turbulence and vibrational effects. Increased drag consumes more fuel and can slow the tow vessel, substantially raising operational costs. As a result, there is a need for a more flexible approach to source towing and seismic source array deployment, which is not subject to all the same limitations of the prior art.

SUMMARY

An unmanned marine vessel system comprises a hull with one or more hull components configured to provide buoyancy in a water column or other body of water, a seismic source configured to generate seismic energy, and a deployment system or apparatus configured to deploy the seismic source from the unmanned vessel into the body of water. The buoyancy can be negative, positive or neutral. The seismic energy can propagate through the body of water and reflects from subsurface structures, allowing a seismic image of the corresponding geological features to be generated.

The unmanned marine vessel can be configured for generating compressed air for the seismic source (e.g., an air gun subarray), using an on-board air compressor. A source line can provide the compressed air to the seismic source, without requiring other external pneumatic connections to the unmanned vessel (e.g., without pneumatic or umbilical contention to a tow ship or other external source).

Suitable embodiments of an unmanned or autonomous marine vessel may include a hull configured to provide buoyancy, a seismic source configured to generate seismic energy, a deployment system configured to deploy the seismic source from the unmanned vessel into a body of water, and a compressor configured for generating compressed air. A source line provides the compressed air from the compressor to the seismic source, and the seismic energy generated by the source propagates through the body of water.

A seismic source array can be configured to include one or more of such unmanned or autonomous vessels, each providing buoyancy in the surrounding water column. The buoyancy can be positive, negative or neutral.

One or more seismic sources can be deployed into the water column from each of the unmanned vessels, e.g., with a source line providing compressed air to the respective seismic sources. The seismic sources can be configured to generate seismic energy from the compressed air. The seismic energy can propagate through the water column and beneath the seafloor or ocean bed to generate a reflected wavefield. The reflected wavefield can be sampled by an array of seismic receivers or nodes to generate acquired seismic data, which can be processed in order to generate images of subsurface reservoirs and other geological structures of interest, in or near the seismic survey location.

Marine seismic survey system embodiments can include a tow ship or other marine vessel having a back deck area, with a docking station configured for deploying a plurality of unmanned or autonomous marine vessels into a body of water. Each of the unmanned or autonomous marine vessels can include a hull configured to provide buoyancy, a seismic source configured to generate seismic energy, and a deployment system configured to deploy the seismic source into an adjacent water column.

A source line can be configured to provide compressed air from the unmanned vessel to the seismic source(s), in order to generate seismic energy that propagates through the water column. Alternatively, one or more of the unmanned marine vessels can provide another seismic component configured for a seismic survey, e.g., a streamer or node, either independently or in combination with a seismic source. The deployment system is configured to deploy the seismic components into the water column, in order to perform the survey.

BRIEF DESCRIPTION OF THE DRAWINGS

FIG. 17A is a plan view of the ramp and slipway system, in the raised or stowed position.

FIG. 17B is an aft view of the stowed ramp and slipway system, showing a representative gantry crane arrangement.

FIG. 17C is a detail view of the gantry crane.

FIG. 18A is an isometric view illustrating unmanned or autonomous source vessel deployment on a ramp and slipway system.

FIG. 18B is an aft view illustrating the source vessel deployment procedure.

FIG. 18C is a section view illustrating the source vessel during deployment.

DETAILED DESCRIPTION

Figure 1:
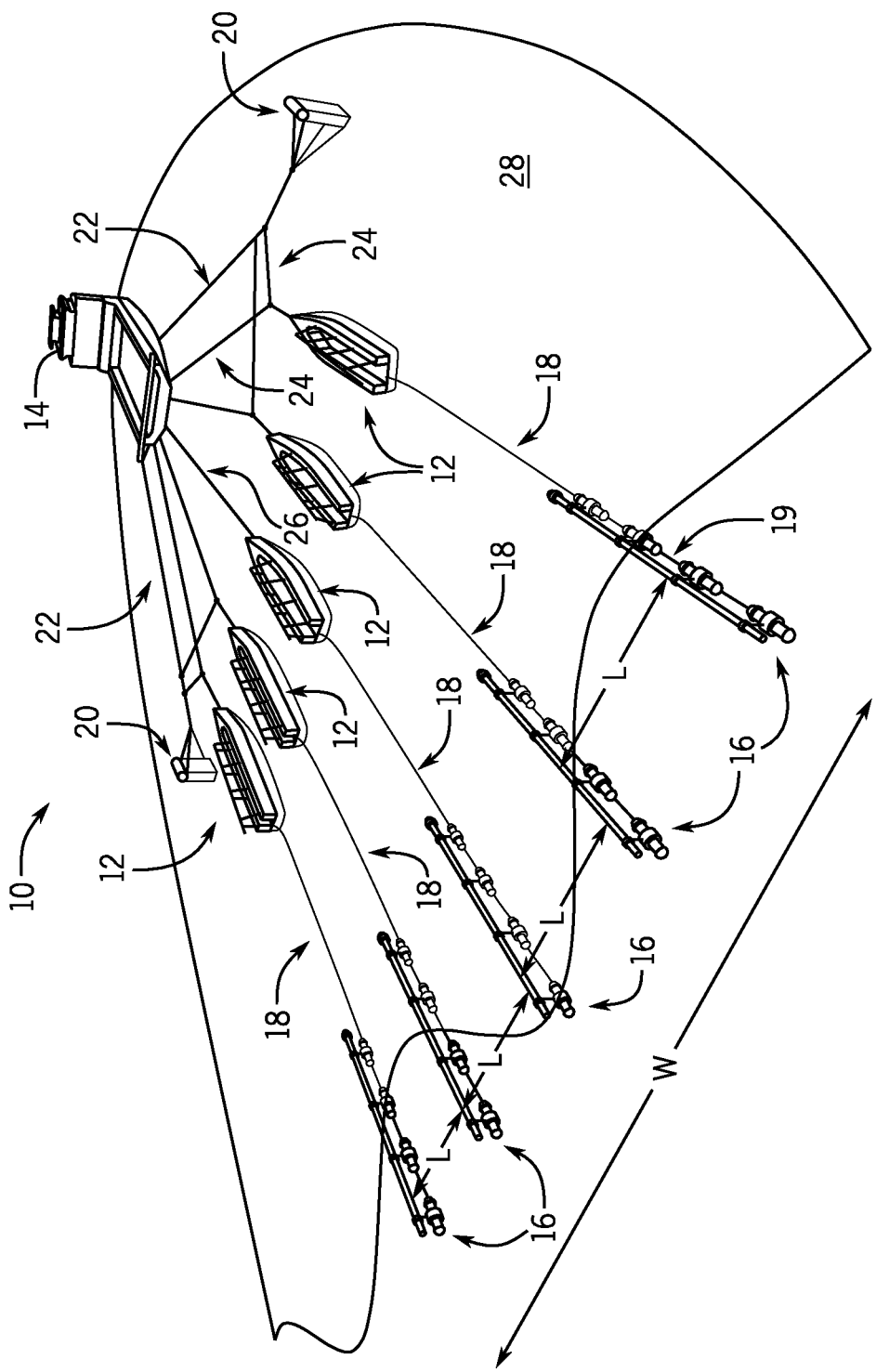
FIG. 1 is a schematic view of a towed seismic source array utilizing one or more unmanned source vessels (UMSVs).

FIG. 1 is a schematic view of an exemplary towed seismic source array 10, utilizing one or more unmanned source vessels (UMSVs) 12. Unmanned source vessels 12 are deployed behind a tow vessel or other seismic ship 14. Air gun subarrays 16 (or other seismic source components) are deployed from unmanned source vessels 12, and connected via source lines 18.

As shown in FIG. 1, paravanes, deflectors, or similar diverter or door systems 20 are deployed to spread unmanned source vessels 12 out behind seismic ship 14. A combination of wide deflector ropes 22, trolley ropes 24, and individual tow ropes 26 can be used to provide the desired overall source width W. Additional trolley ropes or other cross members 24 can be provided to maintain desired spacing L between individual unmanned source vessels 12, and the associated air gun subarrays or seismic sources 16.

In one particular example, annular port air gun clusters or similar source components 16 can be distributed coaxially along the source line, but this is merely one example, and other configurations are also suitable. As shown in FIG. 1, sources 16 are suspended from a tubular float or similar buoyancy member, with source line 18 running along the individual air gun clusters (or other seismic sources) inside a cable harness or housing 19. Alternatively, a traditional tow plate system can be used, with the air gun clusters suspended from the tow plate.

Figure 2:
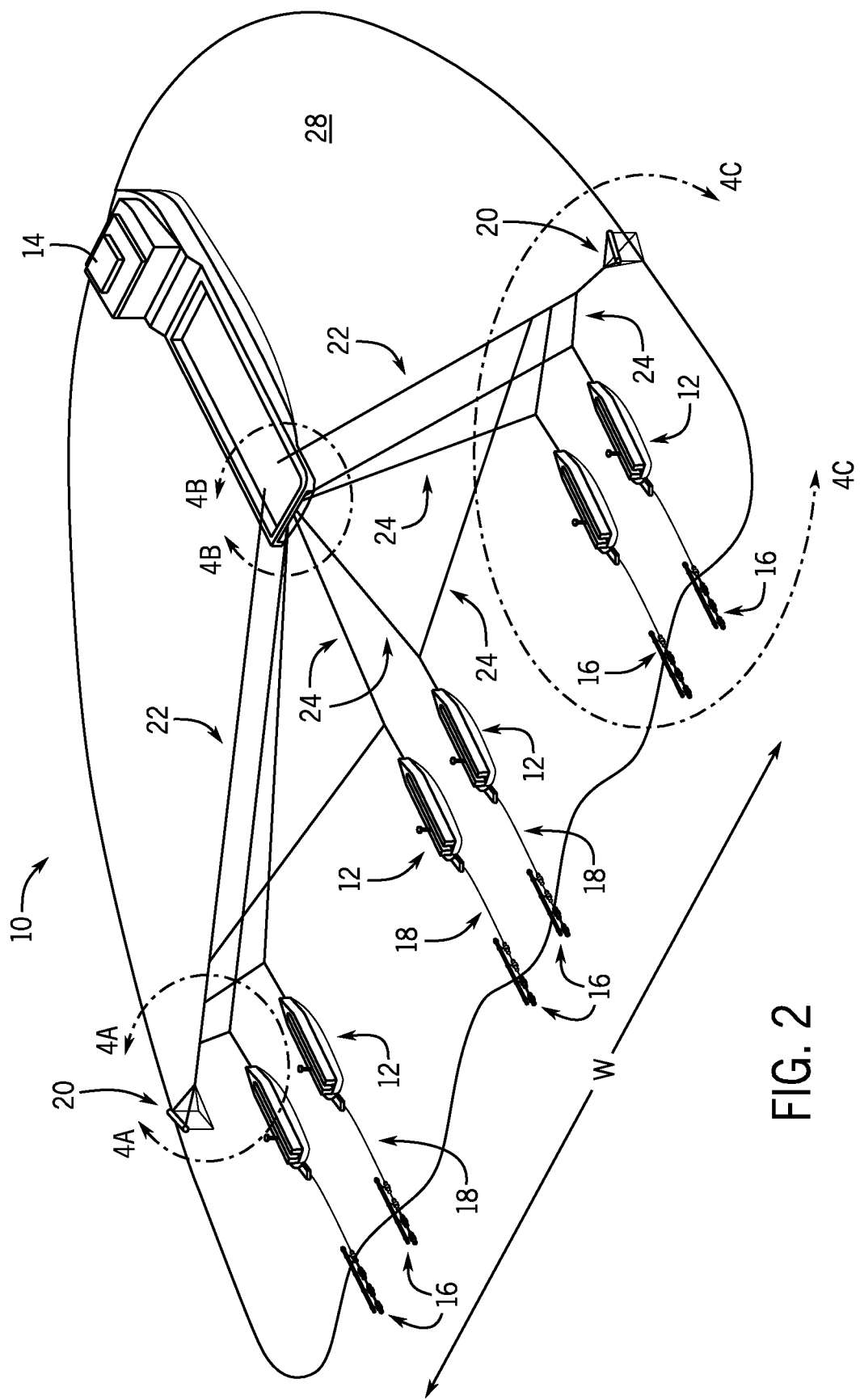
FIG. 2 is an alternate view of the seismic source array, with a paired source configuration.

FIG. 2 is an alternate view of seismic source array 10, with a paired source configuration. As shown in FIG. 2, unmanned source vessels 12 are deployed in sets of two. Each pair of source vessels 12 deploys a corresponding pair of air gun subarrays or other seismic sources 16, with source lines 18 coupling individual subarrays 16 to each unmanned vessel 12 in the pair.

In contrast to existing source deployment technologies, the thicker, heavier pneumatic or umbilical connections in source lines 18 need only be provided between air gun subarrays 16 and the local compressor on board on each unmanned marine (source) vessel 12. Source lines 18 are thus substantially shorter than traditional pneumatic or umbilical cables, because they need not run all the way from the source or subarray 16 to seismic ship 14.

Source lines 18 are also oriented in a substantially parallel orientation with respect to the motion of seismic ship 14 through water column 28, as determined between unmanned source vessels 12 and seismic sources 16. This substantially reduces drag and associated tow stresses, as compared to designs where umbilical cabling must run along the path of trolley lines 24 (or similar cross-cabling arrangement), in order to achieve the desired source array width W.

For example, standard pneumatic and umbilical cabling can range from about 30 mm up to 75-85 mm or more in diameter (that is, 2 to 3+ inches or more). This can create substantial drag and tow stresses when long sections are dragged at an angle through water column 28. In the present design, the pneumatic connections are much shorter, and aligned substantially along the tow direction. Thus, only the smaller ropes need be towed at a substantial angle.

The smaller rope diameters typically range down to 40 mm or less for wide tow ropes and 25 mm or less for trolley ropes and other standard tow cables (that is, 1.5 inches to one inch or less). This substantially reduces drag and tow stresses, as described above. Signal and power cabling can also be provided in the same diameter ranges, without the heavier, larger-diameter cabling required for high-pressure pneumatic connections to the tow vessel. As a result, the overall width or "paint brush" of the seismic source array is less limited by drag and tow stresses, as compared to prior art towing configurations.

Figure 3:
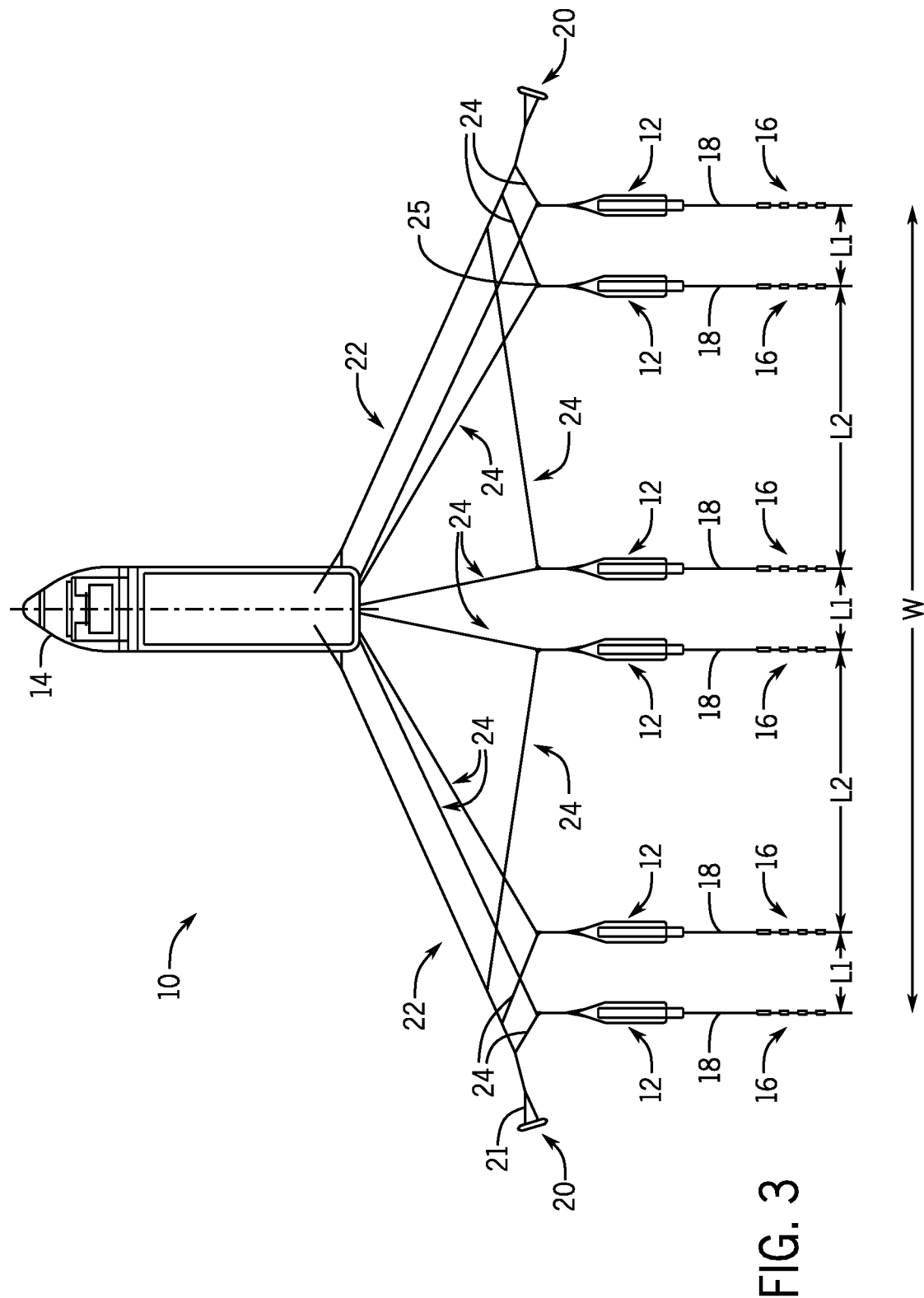
FIG. 3 is a tow diagram for the seismic source array in FIG. 2, illustrating the non-uniform lateral source spacing.

FIG. 3 is a tow diagram for seismic source array 10 of FIG. 2, illustrating the non-uniform lateral spacing between individual sources or subarrays 16. As shown in FIG. 3, six unmanned source vessels 12 are deployed in three sets of two, with relatively smaller spacing L1 between adjacent source vessels 12 in each pair, and relatively larger spacing L2 between adjacent pairs (that is, between the nearest source vessels 12 across the gap between adjacent pairs). In some embodiments, the spacing L2 may be 400 meters or more.

A seismic source or subarray 16 is deployed behind each unmanned source vessel 12, with source line 18 providing pneumatic and signal communications between the air guns (or other source components) and the compressor and local controller hardware on each unmanned source vessel 12. The overall width W of source array 10 is determined by the outermost sources 16, and is maintained by coupling paravanes or deflectors 20 to the outer unmanned source vessels 12. For example, deflectors 20 can be coupled to wide deflector tow ropes 22 via deflector straps 21, with trolley ropes 24 or similar cross-cabling members attached to individual unmanned source vessels 12 using a suitable coupling 25 to a tow bridle and/or tow line (e.g., a pulling grip or cable sock). As shown in FIG. 3, six seismic sources 16 are deployed in three sets of two, with relatively smaller spacing L1 between adjacent seismic sources 16 in each pair, and relatively larger spacing L2 between adjacent pairs (that is, between the nearest seismic sources 16 across the gap between adjacent pairs). Each pair of seismic sources 16 may form an individual source (that is, each pair of seismic sources 16 may function independently as a single source). In these embodiments, FIG. 3 illustrates a triple source embodiment. The seismic source array 10 may include more than three pairs of seismic sources 16, and each pair of seismic sources 16 may be formed with one or more gun arrays.

As shown in FIG. 3, reducing the length of source lines 18 and orienting them substantially parallel to the water flow reduces both drag and tow stresses on source array 10, providing for increased source array width W. In prior art designs, for example, typical source separations are on the order of tens of meters to about a hundred meters or so, limited at least in part by drag effects on the long pneumatic or umbilical cables running from the tow vessel to the seismic source subarrays, many of them oriented at a substantial angle transverse or crosswise to the relative water flow.

In the unmanned source vessel configuration of FIG. 3, drag considerations are substantially reduced, and more similar to what is experienced in a streamer-type array. The tow rope configuration, for example, is substantially similar to that of a streamer deployment, because larger pneumatic and umbilical connections are not required to seismic ship 14. In addition, the short source lines 18 run substantially parallel to the tow velocity, as defined by the relative water flow between air gun subarrays 16 and unmanned source vessels 12.

While source lines 18 may be somewhat thicker than standard streamer cables, they are also substantially shorter. As a result, the overall drag experienced by source array 10 can be reduced down to the order of that experienced in a standard streamer arrangement. Thus, similar overall widths W can also be achieved for source array 10, on the order of hundreds of meters, for example up to a 500 meters or even a kilometer or more.

Figure 4A:
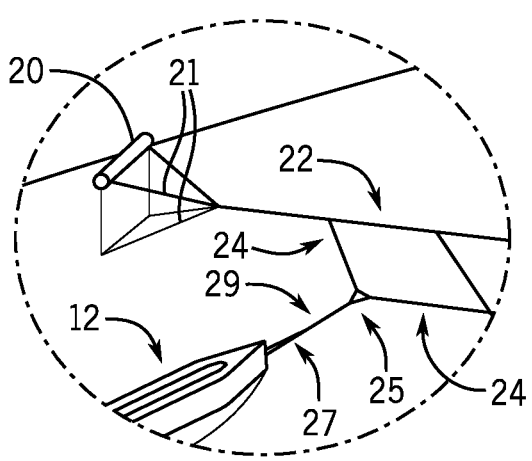
FIG. 4A is a detail view of the seismic source array in FIG. 2, showing the deflector, trolley cable and tow bridle configuration.

FIG. 4A is a detail view of seismic source array 10 in FIG. 2, showing deflector 20, trolley rope 24 and tow bridle 27. As shown in detail A, deflector 20 is attached to wide (deflector) tow rope 22 via deflector straps 21. Trolley rope 24 runs from wide tow rope 22 (e.g., at the coupling to deflector straps 21) through a pulling grip or similar coupling 25 at the front end of a (single) tow line 29. Tow line 29 is attached to unmanned source vessel 12 via tow bridle 27, and to trolley rope 24 at coupling 25.

Deflector 20 maintains the lateral position of unmanned source vessel 12 via trolley rope 24, coupling 25, (single) tow line 29 and tow bridle 27, while being towed via wide tow rope 22 and deflector straps 21. Unmanned source vessel 12 is towed along with deflector 20, via the coupling to tow bridle 27 and (single) tow line 29, which in turn is coupled to trolley rope 24 at coupling 25.

Figure 4B:
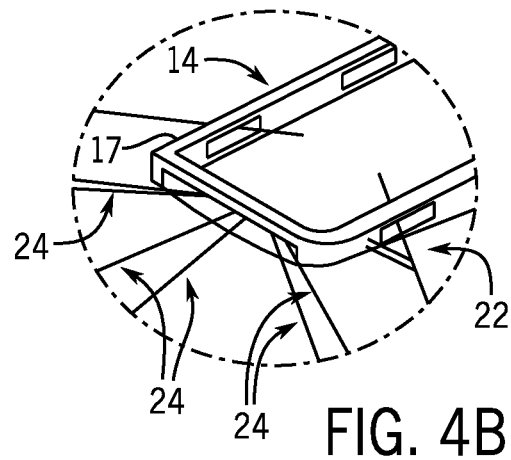
FIG. 4B is another detail view of the seismic source array in FIG. 2, showing the back deck configuration of the tow vessel.

FIG. 4B is another detail view of seismic source array 10 as shown in FIG. 2, illustrating the back deck configuration of seismic ship 14. As shown in detail B, the back deck area of seismic ship 14 is configured with sheaves 17 for towing the paravanes or diverters via wide tow ropes 22, as described above. Additional cable handling components are provided for towing the unmanned source vessels, e.g., via a combination of trolley ropes 24 and/or individual tow ropes 26.

For storage and retrieval of the unmanned (or autonomous) source ships, a davit system can be used. For example, a davit or crane can be mounted on one or both of the port and starboard sides of seismic ship 14, in the back deck region, and configured to lower the hull of the unmanned vessel onto the surface of the surrounding body of water. For retrieval, the davit raises the hull from the surface and deposits it onto the back deck area, either in a designated storage location or for relocation elsewhere. Alternatively, individual slipways can be provided on the stern of seismic ship 14, or the back deck area can be partially submerged for deployment and retrieval. In these embodiments, the unmanned vessels can simply be towed or navigated into the desired location, and stored in place when the back deck area is pumped out.

Figure 4C:
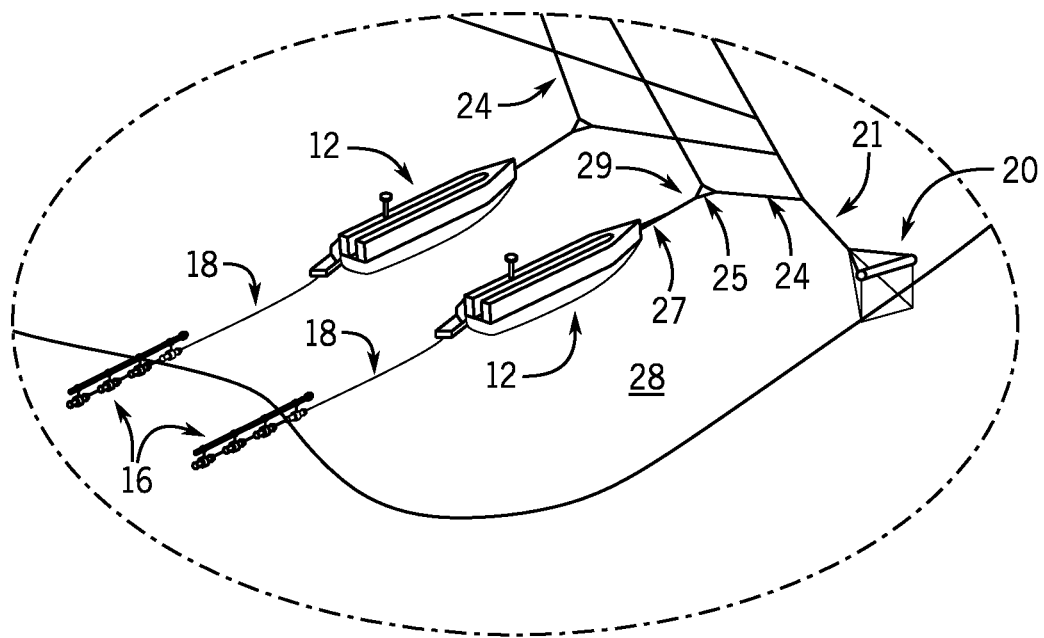
FIG. 4C is a further detail view of the seismic source array in FIG. 2, showing the paired air gun subarray configuration.

FIG. 4C is a further detail view of seismic source array 10 as shown in FIG. 2, illustrating the paired configuration of unmanned source vessels 12 and seismic sources 16 (e.g., air gun subarrays). As shown in detail C, each unmanned source vessel 12 is configured to deploy one of the corresponding pair of air gun subarrays 16, using source lines 18 to provide pneumatics, power and control communications to unmanned source vessels 12.

In one particular example, unmanned source vessels 12 are deployed behind a tow vessel using a combination of trolley ropes 24 with couplings 25 to tow bridles 27 and (single) tow lines 29, as described above. Deflectors or diverters 20 are attached to wide tow ropes 22 via diverter straps 21, in order to maintain the lateral spacing of unmanned source vessels 12 and sources 16. Alternatively, different tow rope and cross-cabling configurations can also be used, as known in the art. Autonomous unmanned source vessels 12 can also be provided, as described below, without direct cabling, tow ropes, or other connections to either deflectors 20 or to the tow vessel.

Figure 5:
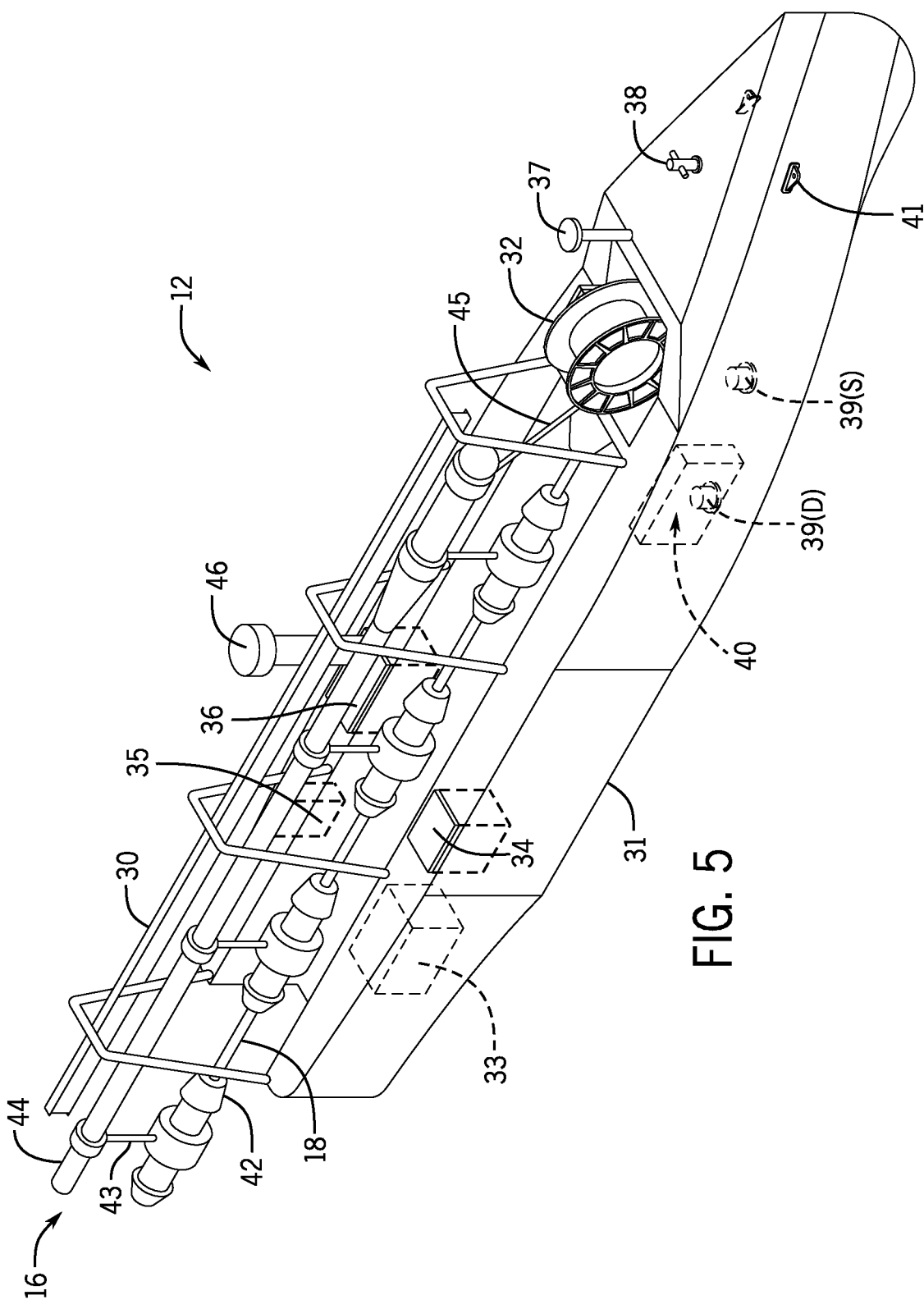
FIG. 5 is an isometric view of an unmanned or autonomous source vessel.

FIG. 5 is an isometric view of a representative unmanned or autonomous source vessel 12, with deployment system 30 configured to deploy a seismic source in the form of air gun subarray 16. In this particular configuration, unmanned source vessel 12 includes a hull structure 31 with winch 32, generator 33, fuel tank 34, battery package 35, and compressor 36. Hull 31 of unmanned vessel 12 also provides a GPS system with antenna 37, a mooring rig or fitting 38, depth and speed transducers 39(D) and 39(S) for vessel control system 40, and tow lugs 41.

Hull structure 31 is configured to provide buoyancy to unmanned vessel 12, in the surrounding body of water. Typically hull 31 provides positive buoyancy, but the buoyancy may also be neutral or even negative, if submerged or partially submerged operations are desired. Hull 31 can also be provided with fins or other depth control elements, so that the depth can be determined as a function of velocity through the water.

Towing lugs 41 can be used to tow unmanned vessel 12, for example using a two-point bridle coupled to a single towing line. The towing line can then be coupled directly to a tow vessel, or coupled between a pair of diverters using trolley lines, spacers or other cross-cabling, as described above. The tow lines can include electrical power and communication or data connections, or they may be provided as a simple rope or cable.

Alternatively, a self-powered, autonomous source vessel (ASV) 12 may be provided, without direct cabling connections to the tow vessel. In these embodiments, an engine and steering system is included on board unmanned source vessel 12, and configured for autonomous navigation by vessel control system 40 in communication with GPS system 37.

Deployment system 30, winch 32, compressor 36, GPS system 37 and vessel control system 40 can all be powered by generator 33, for example using a diesel-powered power take-off generator or hybrid power unit in combination with a rechargeable battery system 35. The compressor and/or generator compartment(s) can also be provided weather-tight air venting system 46, for operation in rough seas or under partially submerged conditions.

Operation of deployment system 30 for deployment and retrieval of air gun subarray 16 is performed in response to commands from on-board vessel control system 40, and/or an external navigational control system. Typically, the command protocol is based on information from GPS system 37, and well as the depth, speed and other information from on-board transducers or sensors 39. This information can be used in combination with wired or wireless communications to a navigational control system, either on board the tow vessel or in another manned seismic source vessel. A cloud-based navigational control system could also be accessed, e.g., via one or more remote networked locations, anywhere on the planet, without necessarily requiring a surface vessel, communications buoy, relay station, or other control/communications equipment within any particular distance of the unmanned source vessel.

Deployment and retrieval control can also be provided directly by the tow vessel, or by autonomous or semi-autonomous (automatic) operation of on-board vessel control system 40 in real time. In these embodiments, operational commands can be based on a combination of position and velocity information obtained from GPS system 37, depth and speed transducers 39(D) and 39(S), and other local on-board systems, either with or without contemporaneous external commands.

For example, one on-board transducer 39 can be configured as a depth sensor (D) to provide a depth signal from which the depth of seismic source 16 is determined with respect to the surrounding water column, either by coupling to seismic source 16 directly, or by sampling the depth at a particular point on hull 31 and determining the source depth based on the state of deployment system 30. In these embodiments, seismic sources 16 can be configured to fire one or more air gun components to generate seismic energy, based at least in part on the depth signal.

Similarly, another on-board transducer 39 can be configured as a speed or velocity sensor (S) configured to provide a signal from which the speed of unmanned vessel 12 through the surrounding water column can be determined. In these embodiments, deployment system 30 can be configured to deploy or retrieve seismic source 16 based at least on the speed, for example in order to automatically or autonomously retrieve seismic source 16 in response to an over-speed or under-speed warning, or to deploy seismic source when the speed is in an acceptable operational range.

Automatic source deployment, firing and retrieval commands can also be generated based on position and velocity information from GPS system 37, for example in response to unmanned vessel 12 entering or leaving a designated survey area, or based on a navigational hazard. These commands can be autonomously generated by on-board vessel control system 40, without the need for contemporaneous external command input, or they can be automatically generated using a direct control link from GPS system 37 and/or one or more on-board transducers 39.

As shown in FIG. 5, air gun subarray 16 includes a number of individual air gun clusters or similar seismic source components 42, which are suspended below a tubular ("sausage") float 44 on one or more support cables 43. In this particular example, air gun clusters 42 are distributed along source line 18, which takes the place of a traditional umbilical cable and provides both pneumatic and control connections to the on-board compressor 36 and vessel control system 40, respectively. Alternatively, a conventional tow plate and harness system can be used. A separate float tow line 45 can also be provided, attached to the front end of tubular float 44.

Figure 6A:
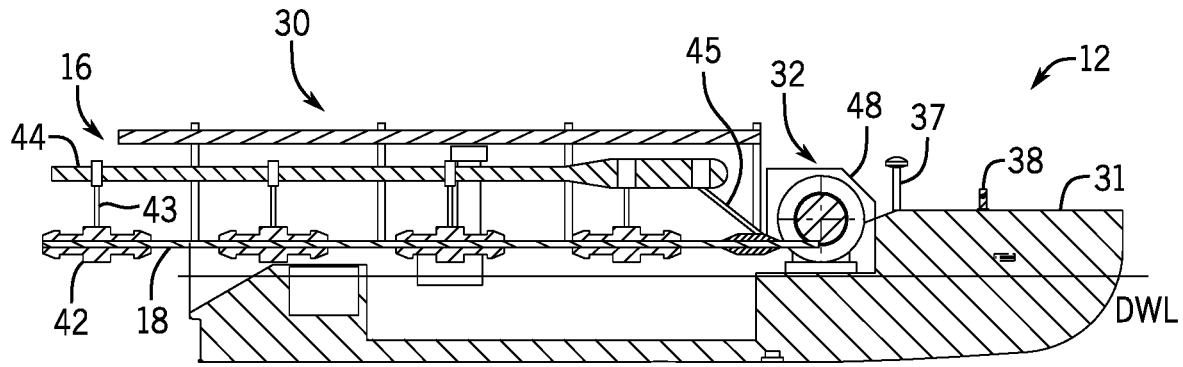
FIG. 6A is a side section view of the unmanned vessel in FIG. 5, showing the centerline profile.
Figure 6B:
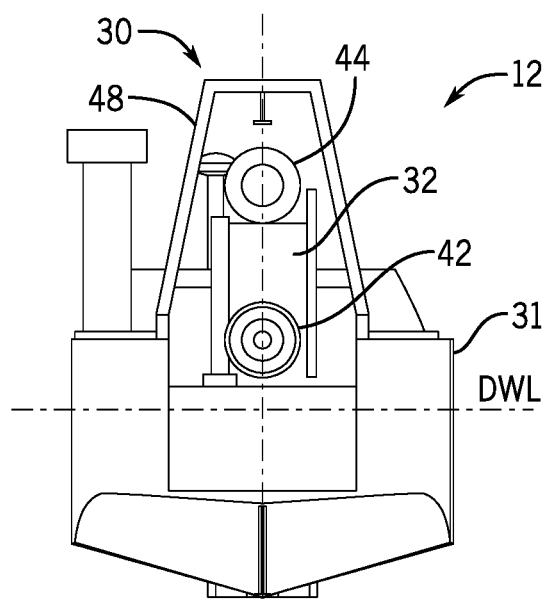
FIG. 6B is a rear view of the unmanned vessel in FIG. 5, showing the deployment system and winch.

FIG. 6A is a side section view of unmanned or autonomous source vessel 12, illustrating the centerline profile and designated waterline DWL. FIG. 6B is a rear view of unmanned vessel 12, showing deployment system 30 and a winch or other cable storage apparatus 32. The winch space can be provided with a coaming and cover system 48, in order to reduce or prevent water ingress.

As illustrated in FIGS. 6A and 6B, deployment system 30 is provided in the form of a beam apparatus, e.g., with an I-beam or similar component running along the length of hull structure 31. The beam is configured to suspend air gun subarray 16 on or above the deck of unmanned vessel 12, either prior to deployment or after retrieval.

During deployment itself, a winch 32 or similar cable storage apparatus pays out source line 18 to deploy air gun subarray 16 aft of unmanned vessel 12. Depending on configuration, support cables 43 can be adjusted for depth before or after deployment into the water column, or they can be of fixed length. Winch apparatus 32 can also pay out a separate float tow line 45, coupled to the front end of tubular float 44.

During retrieval, winch apparatus 32 operates in reverse to retrieve source line 18 and float tow line 45. Support cables 43 can also be adjusted for length on retrieval, so that individual air guns or clusters 42 are suspended from rack-and-beam system 30 above the deck and below tubular float 44.

Alternatively, a fixed-length suspension rope system can be employed, and deployment system 30 can be provided in the form of a slipway, as described below. In additional embodiments, unmanned vessel 12 may have a twin-hulled configuration, allowing air gun subarray 16 to be deployed by simply lowering air gun components 42 into the water column, between the separate hull portions, without requiring a tubular float 44 or other additional buoyancy components.

Figure 7:
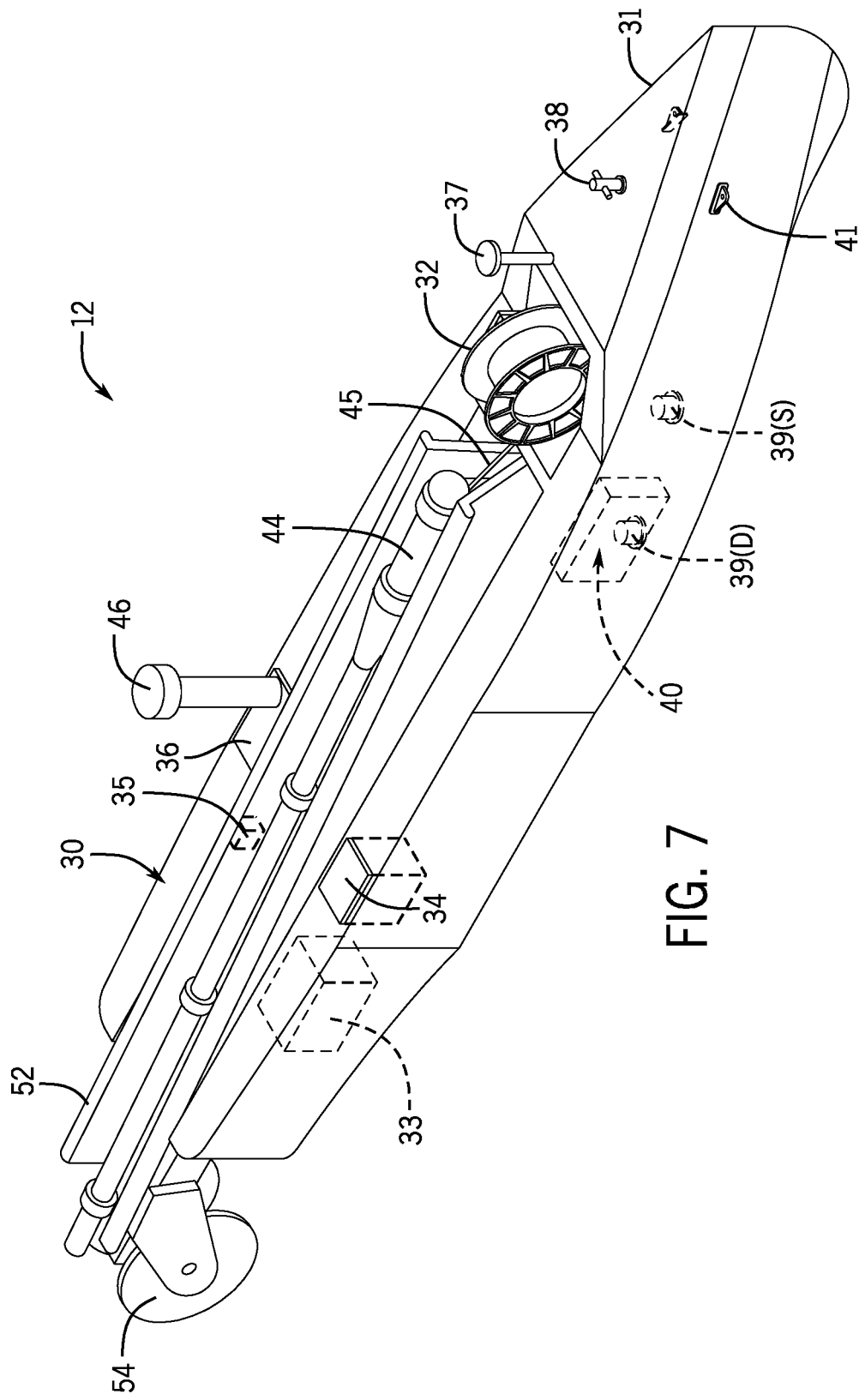
FIG. 7 is an isometric view of an unmanned or autonomous source vessel with a slipway-based system for deployment and retrieval of an air gun subarray.

FIG. 7 is an isometric view of an unmanned or autonomous source vessel 12 with a slipway-based system 30 for deployment and retrieval of air gun subarray 16. As shown in FIG. 7, air gun subarray 16 is deployed from a slide or slipway 52, which is disposed generally along the centerline of hull structure 31, between forward winch apparatus 32 and aft roller 54.

Figure 8A:
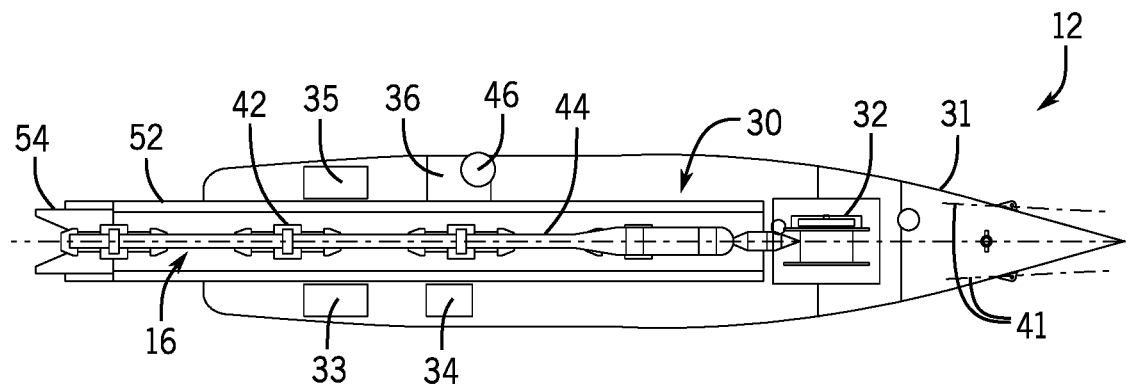
FIG. 8A is a top plan view of the unmanned vessel in FIG. 7, showing the slipway and roller configuration.
Figure 8B:
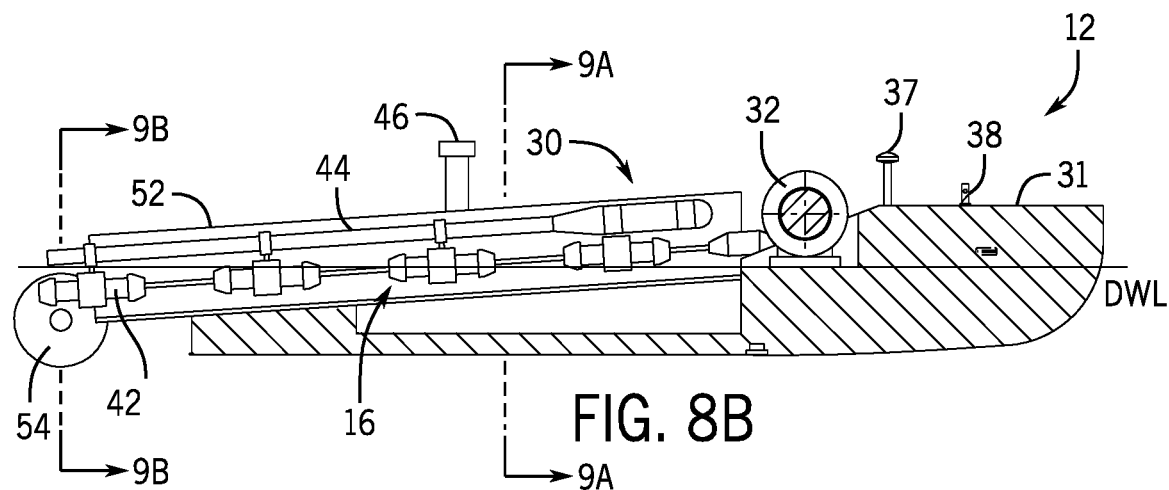
FIG. 8B is a side section view of the unmanned vessel in FIG. 7, showing the centerline profile.
Figure 8C:
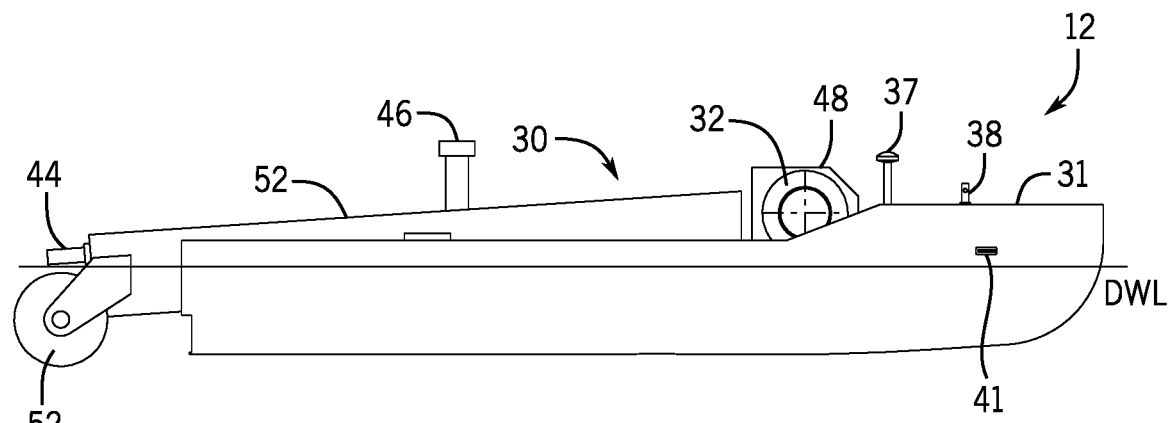
FIG. 8C is a side elevation view of the unmanned vessel in FIG. 7, showing the outboard profile.

FIG. 8A is a top plan view of the unmanned or autonomous source vessel 12 as shown in FIG. 7, illustrating the configuration of slipway 52 and aft roller 54. FIGS. 8B and 8C are side section and side elevation views, respectively, showing the centerline and outboard profiles.

As shown in FIGS. 8A-8C, slipway 52 is provided in the form of a convex trough or tray, which is configured to deploy and retrieve seismic sources 16 in cooperation with aft roller 54 and forward winch 32. In some embodiments, gravity and drag are sufficient to achieve deployment, and winch 32 is used for retrieval. Alternatively, a conveyor system may also be used.

Figure 9A:
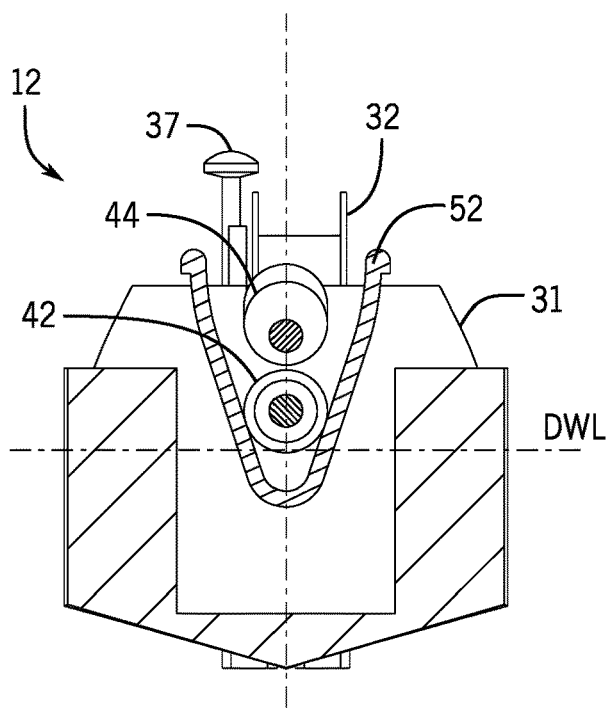
FIG. 9A is a midship section view of the unmanned vessel in FIG. 7, showing the slipway configuration.

FIG. 9A is a midship section view of unmanned or autonomous source vessel 12 as shown in FIG. 7, illustrating the configuration of slipway 52. FIG. 9B is an aft section view of slipway 52, and FIG. 9C is a section view of aft roller 54.

Figure 9C:
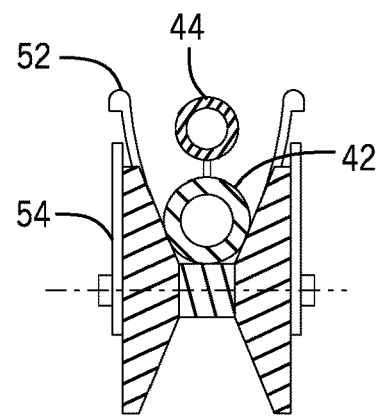
FIG. 9C is a section view of an aft roller for the unmanned vessel in FIG. 7.
Figure 9B:
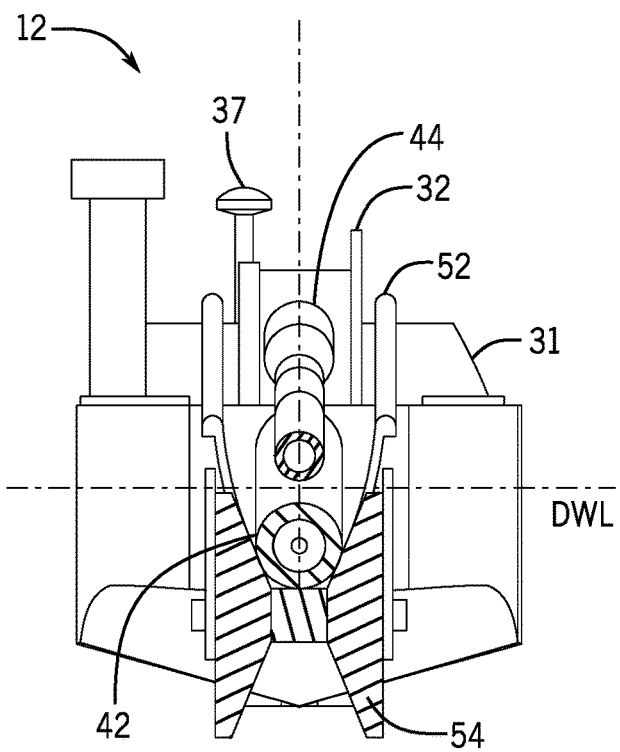
FIG. 9B is an aft section view of the unmanned vessel in FIG. 7, showing the roller configuration.

FIGS. 9A-9C illustrate the position of tubular float 44 and air gun components 42 when retrieved into slipway 52 by winch 32. Components 42 are provided in the form of air gun clusters, and the suspension depth can be adjusted after deployment and before retrieval, as described above.

Figure 10A:
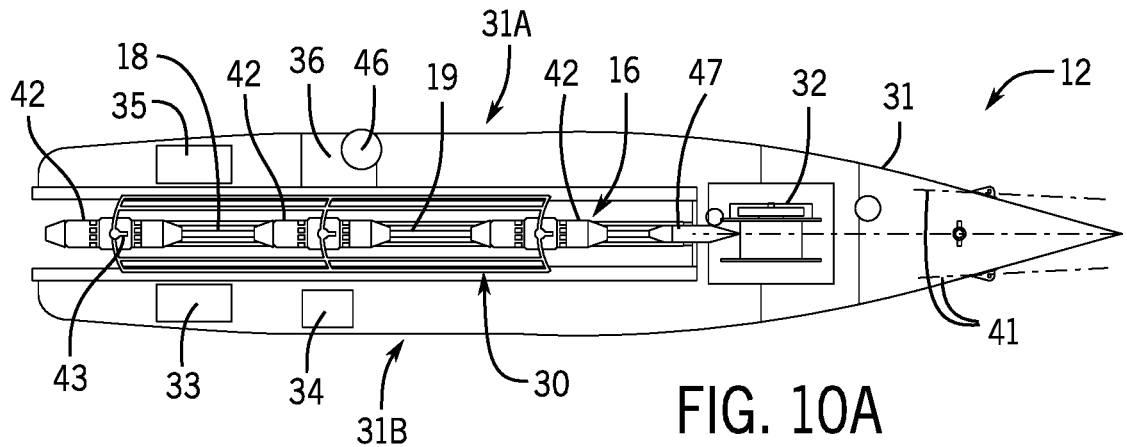
FIG. 10A is a top plan view of an unmanned or autonomous source vessel with a twin-hull configuration.

FIG. 10A is a top plan view of an unmanned or autonomous source vessel 12, in a twin-hull configuration. As shown in FIG. 10A, the main deck area of hull structure 31 is divided into port (left) and starboard (right) sections 31A and 31B, respectively.

Air gun subarray 16 is supported on deployment system 30, e.g., using one or more support cables 43, and is disposed between port hull section or component 31A and starboard hull section or component 31B. In this particular example, subarray 16 is again composed of a plurality of air gun clusters 42, e.g., in an annular port design or tow plate configuration, distributed along or suspended from an annular chain or cable/hose harness 19.

In this embodiment, separate umbilical lines and float systems are not necessarily required. Instead, source line 18 is connected at bell housing 47 to provide pneumatic connections inside the cable harness (or housing) 19. The appropriate length of source line 18 can then be paid out or retrieved forward of bell housing 47, as air gun subarray 16 is deployed and retrieved in a substantially vertical direction.

Deployment system 30 can be configured to control the depth of each individual air gun cluster 42 using individual support cables 43 coupled directly to deployment system 30. Alternately, one or more support cables 43 may be absent, with air gun subarray 16 supported by the connection to source line 18 at bell housing 47. In these examples, individual air gun clusters 42 may hang substantially vertically into the water column, or they can be deployed at an angle determined by the velocity of unmanned vessel 12 and the drag of air gun clusters 42 and cable harness or housing 19.

Figure 10B:
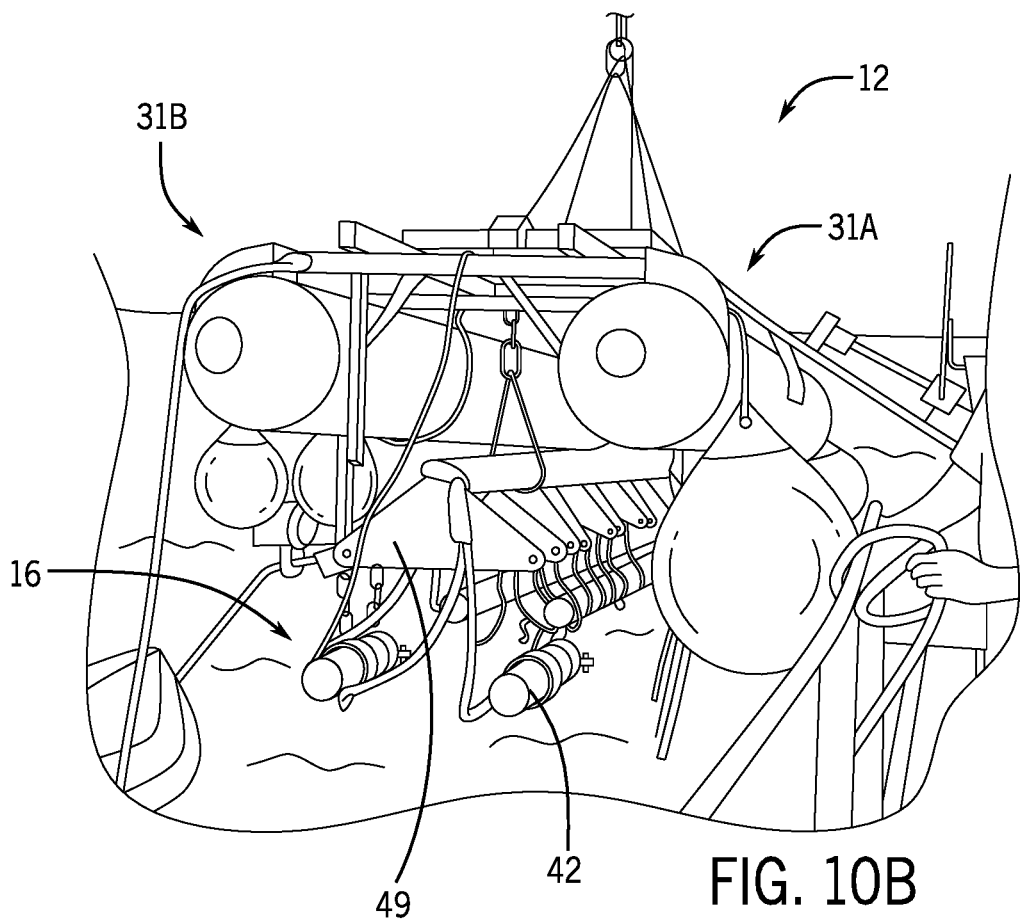
FIG. 10B is a perspective view of an alternate twin-hulled configuration for the unmanned vessel in FIG. 10A.

FIG. 10B is a perspective view of an alternate twin-hulled configuration for unmanned or autonomous vessel 12. In this catamaran or pontoon type configuration, port and starboard hull sections 31A and 31B are formed by separate float portions or members, and there may be no traditional deck surface. Air gun subarray 16 is deployed vertically and supported between hull sections 31A and 31B, without a tubular float member or other independent flotation component, as described above. In this particular example, air gun clusters 42 are suspended below a traditional tow plate apparatus 49.

Figure 11A:
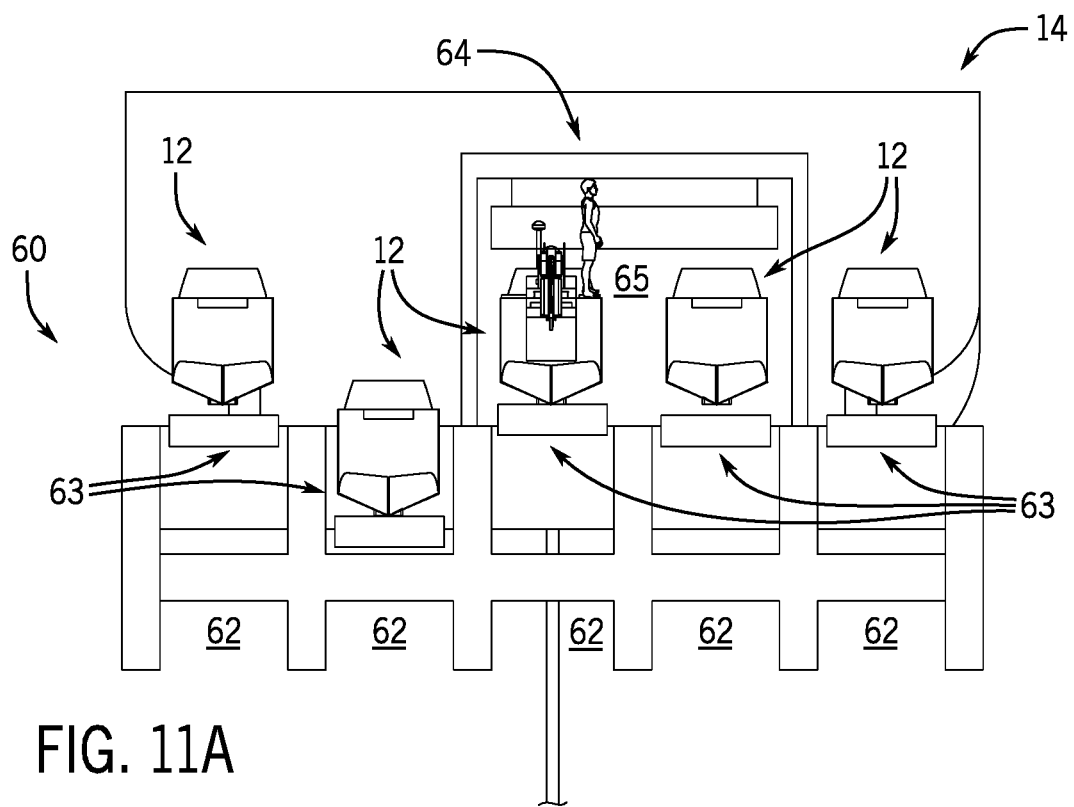
FIG. 11A is an end view of a docking station for deploying and retrieving unmanned or autonomous marine vessels.

FIG. 11A is an end view of a docking station 60 for unmanned or autonomous marine vessels, on the aft end or stern of a tow vessel or seismic ship 14. For example, docking station or apparatus 60 can be configured with a number of bays 62 for deployment and retrieval of individual unmanned or autonomous source vessels 12, as described herein.

As shown in FIG. 11A, docking station 60 provides five bays 62, arranged side-by-side along the stern of seismic ship 14. More or fewer bays 62 can be provided, and the location may vary, e.g., along the port or starboard side of seismic ship 14, or in the bow area.

Each docking bay 62 is adapted to accommodate an unmanned or autonomous vessel 12. Lift mechanisms 63 are configured for deploying individual unmanned vessels 12 by lowering the vessel hull into the water, in the lower portion of docking bay 62, and to retrieve the vessel by lifting the hull out of the water, back up into the upper portion of bay 62.

A gantry crane 64 is configured to access each of the bays 62, for management and service of unmanned or autonomous marine vessels 12. Gantry crane 64 can also be used to transport unmanned vessels 12 for storage and maintenance inside the back deck area of the tow vessel or seismic ship 14, e.g., via an access door or hatchway 65.

Figure 11B:
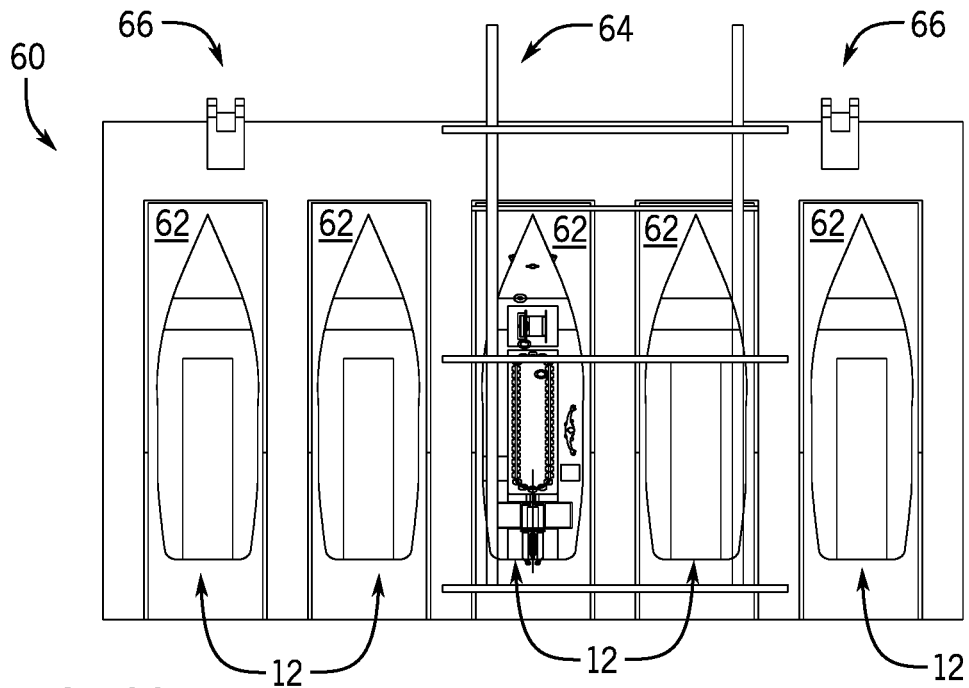
FIG. 11B is a top plan view of the docking station, showing the individual docking bays.

FIG. 11B is a top plan view of docking station 60, showing the individual docking bays 62 for unmanned or autonomous marine vessels 12. As shown in FIG. 11B, docking station 60 can be coupled to the stern of the tow ship or seismic vessel, for example using one or more articulated coupling fixtures 66. Coupling points or fixtures 66 can be configured to articulate with sea action, allowing for relative motion of docking system 60 with respect to the stern of seismic ship 14. Alternatively, docking station 60 can be more or less permanently attached to the aft end seismic ship, or the docking components can be mounted directly onto the back deck area.

Figure 11C:
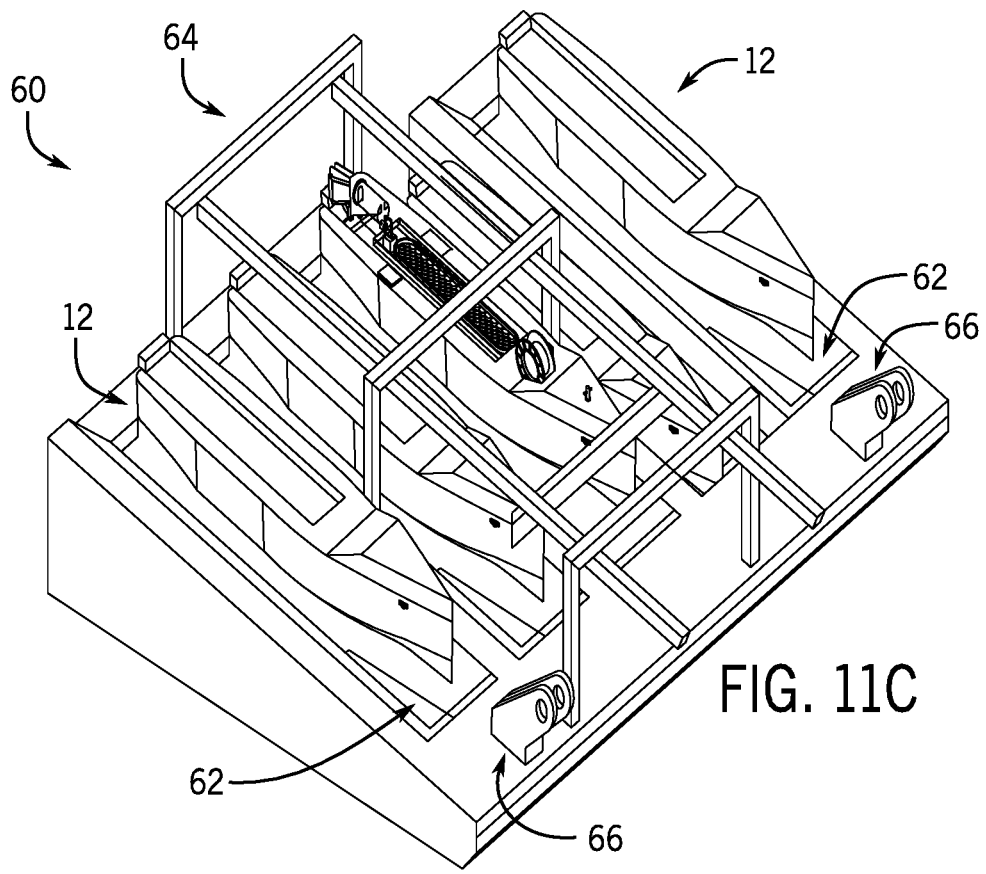
FIG. 11C is a perspective view of the docking station in FIGS. 11A and 11B.
Figure 11D:
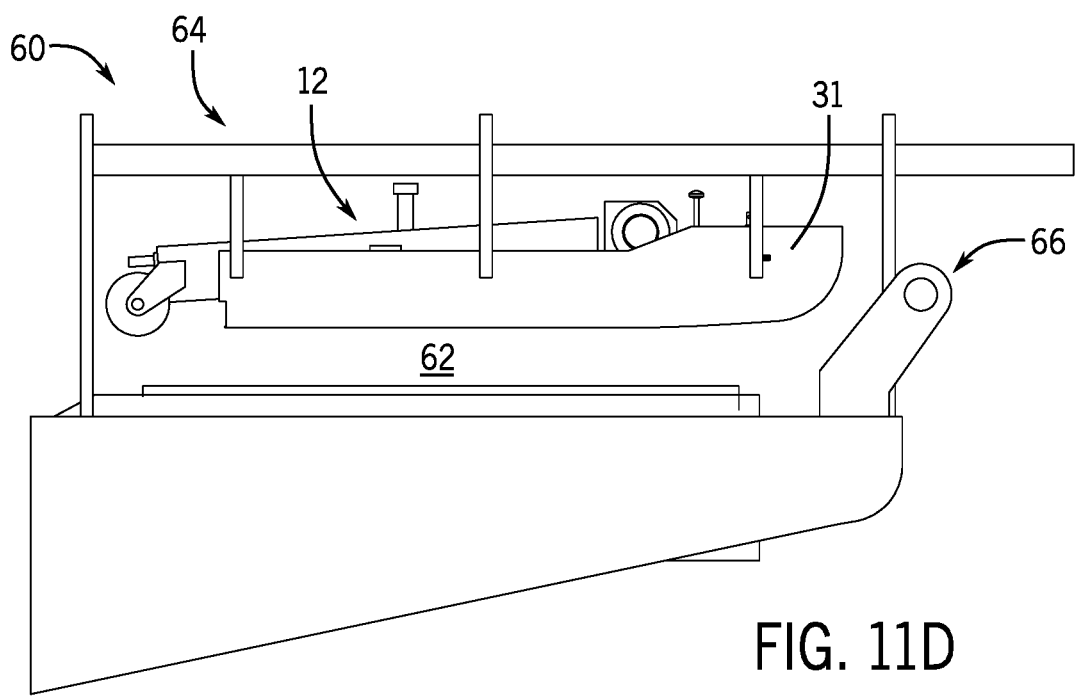
FIG. 11D is a side elevation view of the docking station, illustrating operation of the gantry crane.

FIG. 11C is a perspective view of docking station 60, as shown in FIGS. 11A and 11B. FIG. 11D is a side elevation view, illustrating operation of gantry crane 64.

Depending upon application, docking station 60 can be provided with articulated coupling fixtures 66 for some operations, and then fixed or pinned into position with additional coupling members when using the gantry crane. This option reduces relative motion with respect to the seismic ship, when performing deployment, recovery, or service operations on unmanned or autonomous vessels 12. In addition, the seismic ship could also be configured to sail with docking station 60 attached during survey operations, and with docking station 60 removed for transits.

Docking station 60 can thus be fabricated in one location, and then assembled and installed or removed at any number of other suitable port facilities. This provides for additional flexibility in choice of materials and construction methods, in order to save weight and reduce costs.

While docking station 60 may impact vessel maneuverability, operations can also be performed at low speeds or under other conditions where the operational impacts may be compensated for and reduced or minimized. In addition, the vessel attachment points may be subject to regulatory considerations (e.g., class approval), but the platform and/or docking station itself may not have the same requirements.

Figure 12:
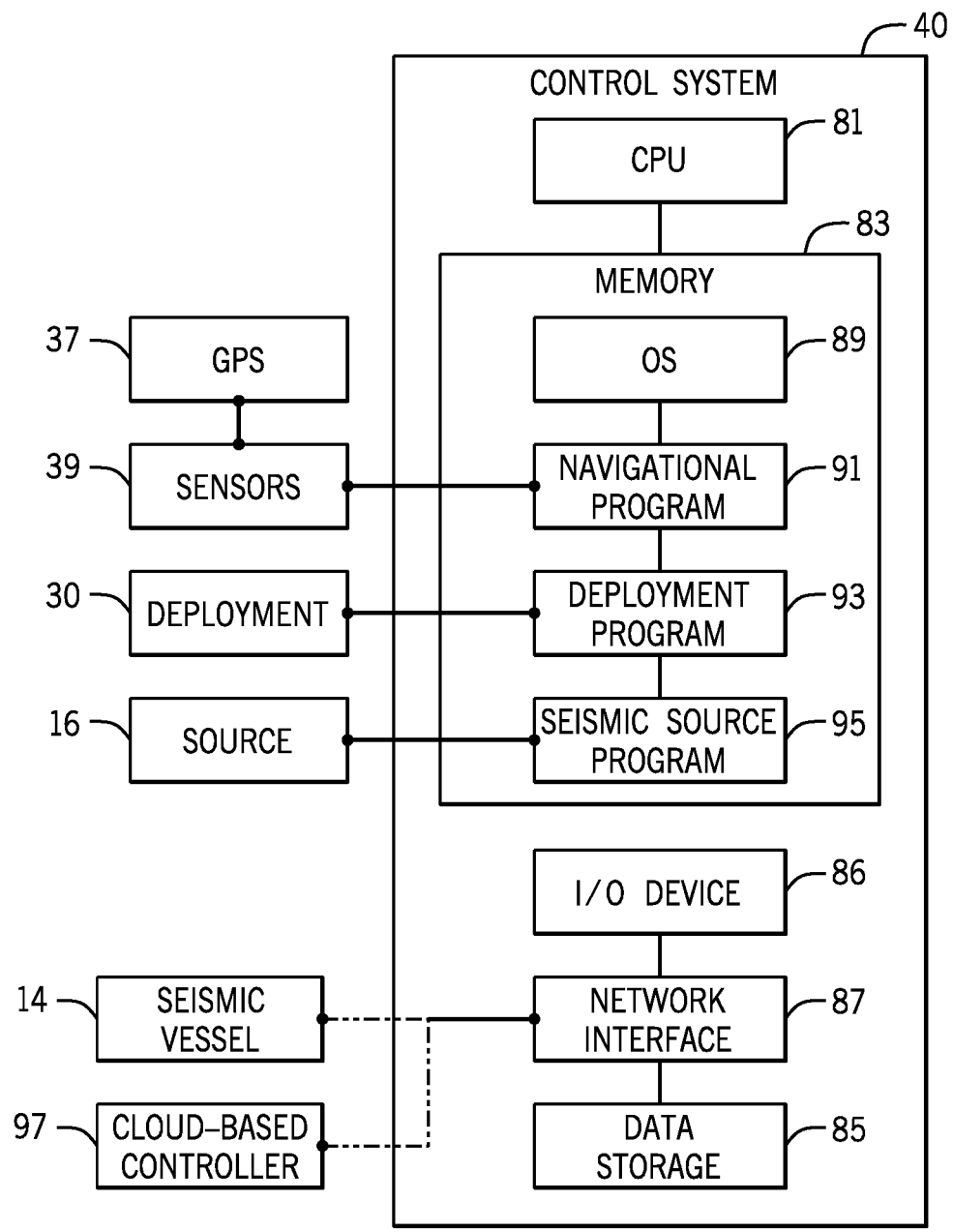
FIG. 12 is a block diagram of a control system configured for operation of an unmanned or autonomous marine vessel.

FIG. 12 illustrates an exemplary vessel control system 40, suitable for operation of an unmanned or autonomous marine vessel, as described herein. As illustrated in FIG. 12, vessel control system 40 includes a computer processor or central processing unit (CPU) 81, memory 83, data storage 85, one or more input/output (I/O) devices 86, and one or more wired or wireless network interfaces 87. While a single processor 81 is shown, a plurality of processors 81 and other computer components 83, 85 and 86 can be implemented, and multiple computer systems can be combined into a given vessel control system 40.

Input/output devices 86 typically include a monitor and a locally accessible keyboard or other input device, which can be used during system setup and maintenance but are not typically required during unmanned and autonomous operations. Network interface devices 87 incorporate both wired and wireless hardware for external communications, e.g., with a control and navigational system on board the tow vessel or ship 14, and/or with a wireless network or cloud-based data storage and processing system.

Suitable on-board memory 83 and data storage media 85 include, but are not limited to, random access memory, read-only memory, disc drives, portable memory devices, and direct and indirect access storage devices. Memory 83 and data storage media 85 may also share address space and logical descriptors, spanning multiple physical storage devices and media formats.

Memory 83 is configured to access program code stored on one or more non-transitory storage components or computer-readable media 85, for execution by processor 81 in the form of an operating system (OS) 89 and one or more of a location or navigational program 91, an operational deployment program 93, and a seismic source firing program 95.

Navigational program 91 is configured to process information from GPS system 37, along with depth, speed and other information from sensors 39. Other on-board systems such as optical, sonar and radar-based location systems can also be used, in order to determine the absolute geographical location and velocity of the unmanned vessel, as well as the relative position and velocity with respect to the tow ship and other unmanned vessels in the source array.

In autonomous operation, vessel control system 40 is configured to operate navigational program 91 to maintain course, depth and position for air gun subarray 16 within or with respect to a desired survey area, and with respect to any navigational hazards or other locational references that may exist. Navigational program 91 can also be configured for vessel control system 40 to maintain the desired inter-source spacing with respect to other source components in the array, as well as the overall width or "paintbrush," as described above.

Deployment program 93 is configured for operation of deployment system 30, in order to deploy and retrieve the air gun subarray or other seismic source 16. Typically, deployment and retrieval signals are determined in cooperation with navigational program 91, for example based on entry or departure from a designated seismic survey area. Similarly, seismic source program 95 can be configured for firing seismic sources 16 at desired depths and in selected locations within the survey area, as determined by navigational program 91.

Vessel control system 40 can be configured to operate in either autonomous or semi-autonomous mode, using interface hardware 87 for wired communication with a navigational system on board a seismic ship, or with a cloud-based navigational control system 97 (e.g., using a long-range radio or satellite relay to access a navigational control system at one or more remote network locations). In these embodiments, operation of deployment system 30 and seismic sources 16 can be performed based on a combination of external command input and information from local navigational program 91. Typically, vessel control system 40 will retain at least some level of autonomy even without contemporaneous external command input, for example the ability to make course corrections based on on-board data indicating a navigational hazard, or to override external deployment signals and/or retrieve seismic source 16 based on speed, position or depth information, as described above.

Figure 13:
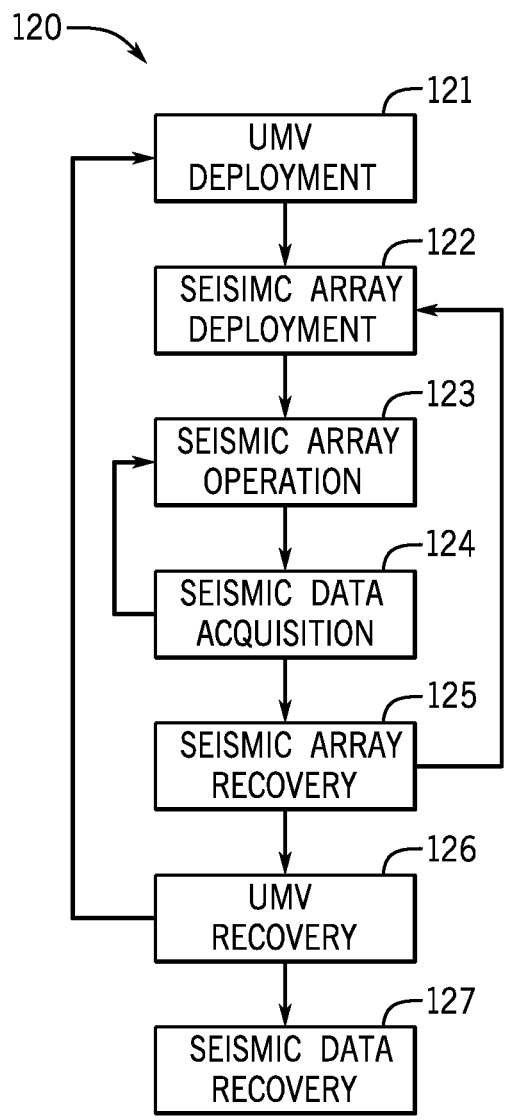
FIG. 13 is a block diagram of a method for operating one or more unmanned or autonomous source vessels to perform a marine seismic survey.

FIG. 13 is a block diagram of a method 120 for operating one or more unmanned or autonomous source vessels to perform a marine seismic survey, as described herein. As shown in FIG. 13, method 120 may include one or more steps of unmanned or autonomous vessel (UMV) deployment (step 121), seismic array deployment (step 122), seismic array operation (step 123), seismic data acquisition (step 124), seismic array recovery (step 125), and vessel recovery (step 126). The steps can be performed in any order or combination, and iterated as desired in order to provide suitable seismic data for recovery (step 127) and imaging the subsurface structures of interest in a given survey area.

Vessel deployment (step 121) can encompass operating one or more unmanned or autonomous source vessels in a desired seismic survey area. Depending upon application, the vessels may be deployed from a tender vessel or mother ship, for example using a gantry crane and slip-based docking apparatus on the back deck, as described herein. Alternatively, the back deck area can be partially submerged or flooded, and the unmanned source vessels can be individually positioned in the flooded or submerged area as desired.

In some embodiments, the vessels are towed behind a source boat or seismic ship, for example using a paravane or diverter system with suitable tow lines, trolley lines and other components in order to maintain a desired spacing. Alternatively, one or more of the vessels can be towed behind a chase vessel or other surface vessel of opportunity, or provided in self-propelled, autonomously navigated form.

Seismic array deployment (step 122) can encompass deploying a set of one or more seismic sources from each of the unmanned source vessels. For example, the vessels may be configured with a track and rack-based magazine storage apparatus or carousel system, using a stacker/destacker or similar loading mechanism to select individual sources for deployment. The sources can be coupled to a source line via a clamping mechanism or tether member, and deployed into the surrounding water column using a winch mechanism and line store in combination with a sheave mechanism on the after end of the vessel. Alternatively, the seismic sources can be deployed along an ocean bottom cable or rope, or an articulated arm or pusher mechanism can be used to deploy autonomous sources at any desired depth and orientation, without necessarily requiring a cable connection.

Seismic array operation (step 123) can encompass providing power to the deployed sources and firing the seismic sources to generate seismic energy in the form of acoustic waves, which propagates through the water column to generate the seismic wavefield. For example, compressed air can be provided to the deployed sources via source lines coupled with a compressor on an unmanned or autonomous vessel. Suitable operational control commands can also be provided in real time, for example source firing begin, stop and pause commands, along with precision timing information for the local clocks on the individual sources, in order to maintain synchronization across the seismic array. Seismic array operation can also encompass providing commands to position the sources during firing, for example by controlling steering devices disposed along the deployed ropes or cables in order to maintain a desired depth and spacing with respect to other sources in the seismic array, or to change the deployment depth in order to change the source array geometry or avoid a navigational hazard.

Seismic data acquisition (step 124) can encompass acquiring seismic data with the deployed array, for example using a variety of hydrophones, geophones and other seismic sensors disposed on the sources in order to sample seismic energy generated by the sources. The seismic data can be time stamped using a local clock on the source, and stored together with the associated timing information. In some embodiments, seismic data acquisition includes providing commands to alter the seismic array operation, in order to maintain synchronization across the seismic array.

Seismic array recovery (step 125) can encompass recovering the deployed sources, for example using a winch and sheave mechanism to retrieve a source line from the water column. In some embodiments, the sources can be decoupled from the source line for storage, for example using a rack or magazine-based carousel arrangement. Alternatively, an articulated arm or pusher mechanism can be used to recover autonomous seismic sources deployed individually onto the ocean bottom, or at any depth and orientation in the water column.

Vessel recovery (step 126) can encompass recovery of the unmanned source vessels to a tender ship or other vessel, for example using a docking apparatus or a submergible back deck area as described above. In some embodiments the unmanned vessels are towed for deployment, operation, and recovery, and in other embodiments one or more of the vessels can be self-propelled and configured for automatic or autonomous navigation during deployment and recovery.

Seismic data recovery (step 127) can encompass communication of the acquired seismic data in real time by the unmanned source vessels during array operation, after recovery of the seismic sources onto the individual unmanned vessels, or upon recovery of the unmanned vessels to a source boat, chase vessel, tender, or other surface vessel. The seismic data can be used along with seismic data received from seismic sources, receivers and nodes to generate images of subsurface structures in the survey area, for example using waveform inversion techniques.

Ramp and Slipway Deployment System

Figure 14A:
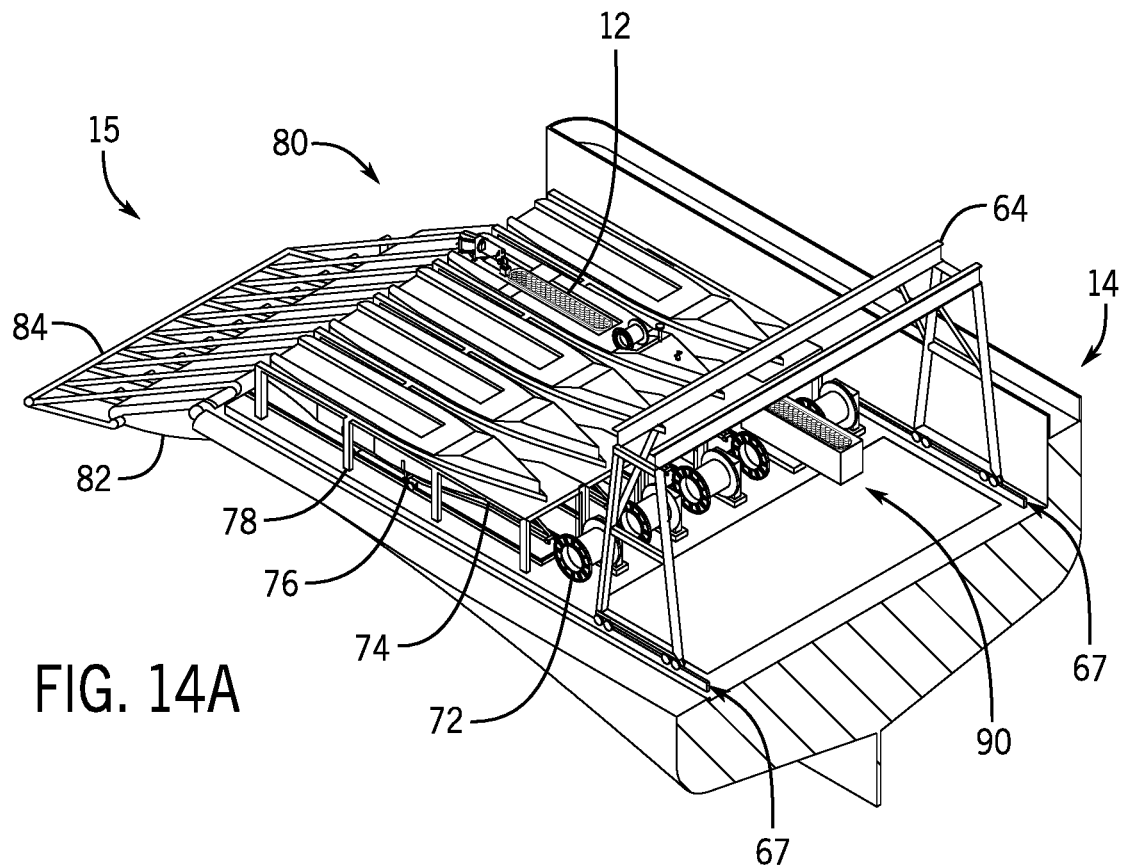
FIG. 14A is an isometric view of a docking apparatus with a hinged ramp and slipway system for unmanned or autonomous source vessels.

FIG. 14A is an isometric view of an alternate docking apparatus 15 mounted on the back deck area of a seismic ship 14, with a hinged ramp and slipway system 80 for autonomous source vessels 12. As shown in FIG. 14A, one or more of a tow winch 72, docking station or platform 74 and carriage 76 disposed on tracks or rails 78 can be provided for each source vessel 12, and configured for deployment and retrieval operations on the hinged ramp 82 and hinged slipway 84.

The docking apparatus 15 may also include a gantry crane 64, e.g., mounted on tracks or rails 67 for servicing the source vessels 12 before, during and after deployment and retrieval operations. In some embodiments, the gantry crane 64 can be configured to load portable source storage and stacker modules or units 90 onto source vessels 12. In these embodiments, the sources can be preloaded into modules 90 configured for removably mounting to the hull structures of selected source vessels 12, for example using a rack-based magazine storage configuration with a stacker/destacker or similar loading mechanism, as described herein.

Figure 14B:
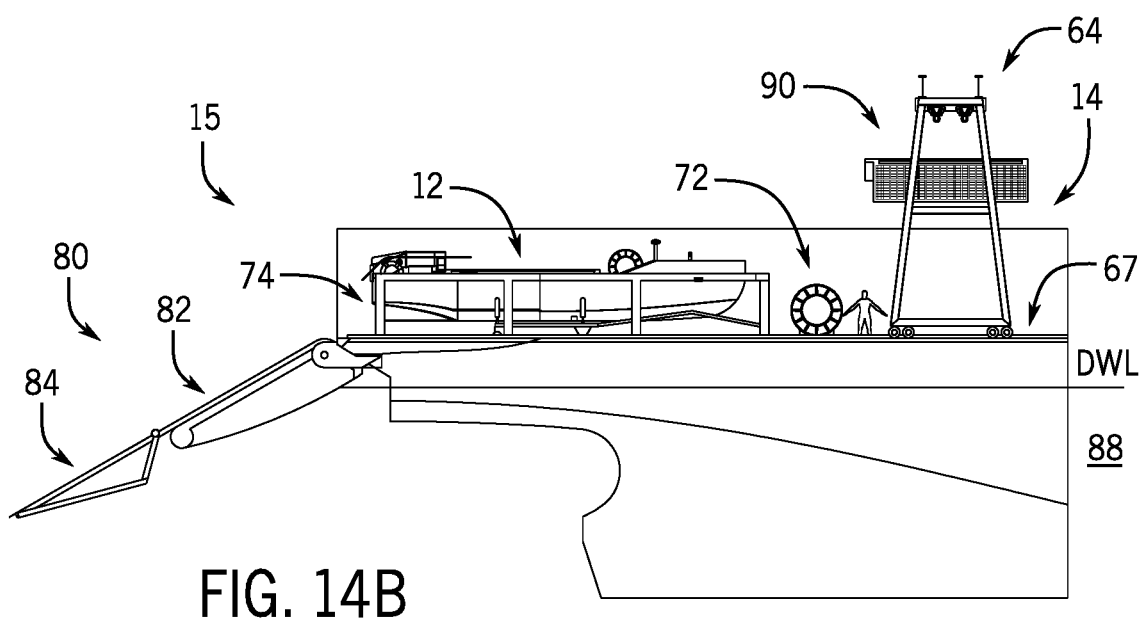
FIG. 14B is a profile view of the ramp and slipway system, in a deployed configuration.

FIG. 14B is a profile view of the ramp and slipway system 80, in a deployed configuration. As shown in FIG. 14B, the hinged ramp(s) 82 and slipway(s) 84 have been deployed off the back deck area of the seismic ship 14, e.g., with each hinged ramp 82 extending down through the designated water line (DWL) to a slipway 84 configured for deployment and retrieval of source vessels 12 in the surrounding body of water (or water column) 88.

Figure 15A:
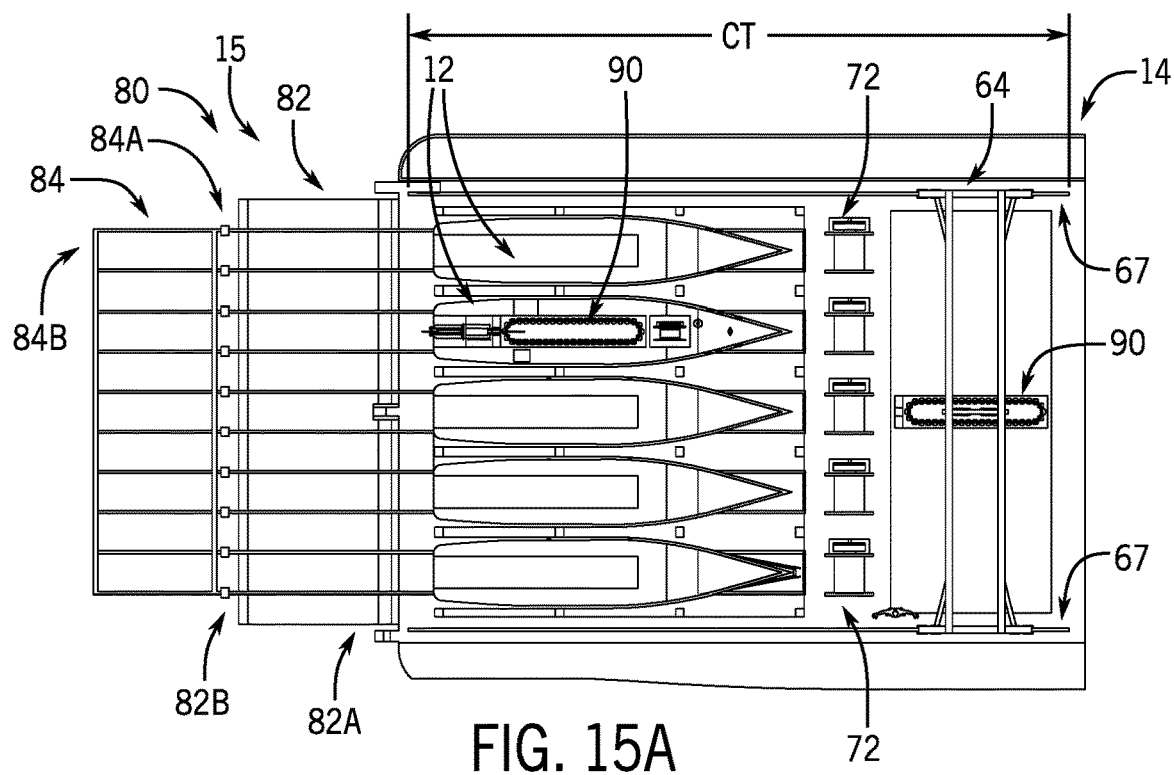
FIG. 15A is a plan view of the deployed ramp and slipway system.
Figure 15B:
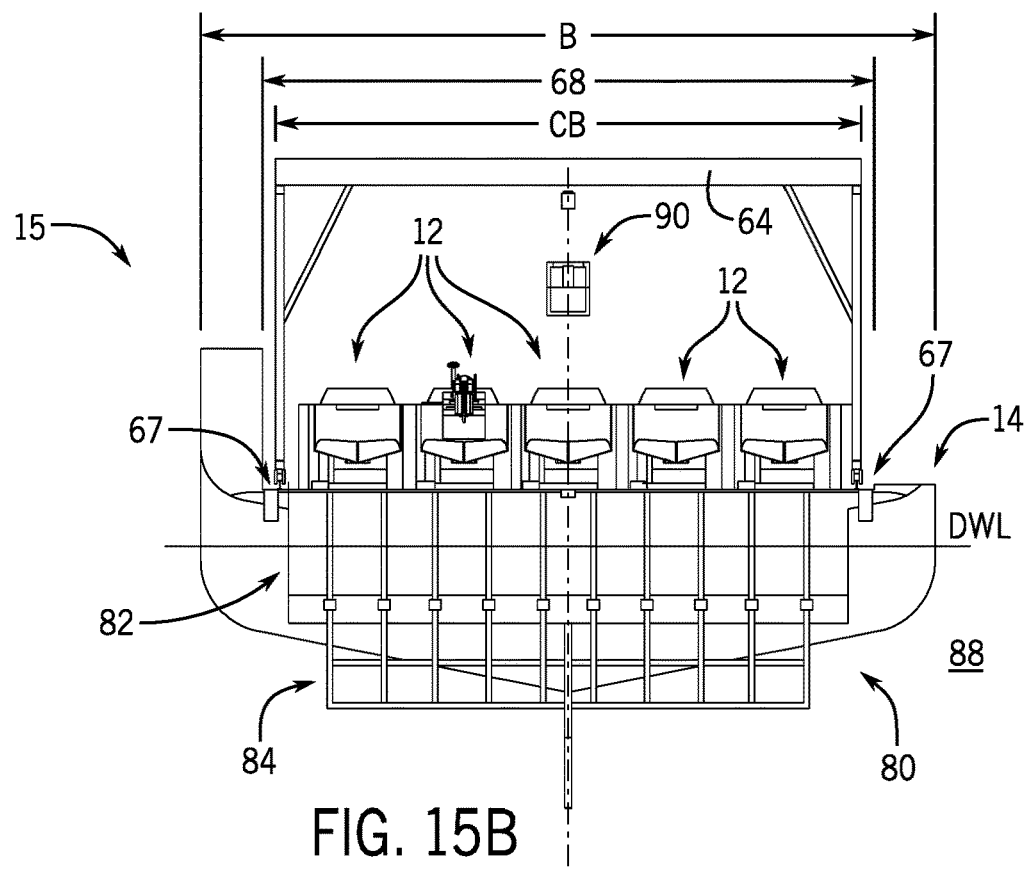
FIG. 15B is an aft view of the deployed ramp and slipway system.

FIG. 15A is a plan view of the ramp and slipway system 80 deployed from the back deck of a seismic ship 14. FIG. 15B is an aft view of the deployed ramp and slipway system 80.

As shown in FIGS. 15A and 15B, the folding ramp 82 and slipway assemblies 84 are provided in an articulated configuration, with the ramp components 82 having a hinged coupling to the back deck of seismic ship 14 on one end (e.g., the proximal or forward end) 82A, and another hinged coupling to slipways 84 on the opposite (e.g., distal or aft) end 82B. Similarly, the slipways 84 have a hinged coupling on the proximal (forward) end 84A, which couples to the distal end 82B of the ramp members (or ramp assembly) 82. The opposite (distal or aft) end 84B is disposed in the water column, as described above.

The gantry crane 64 can be mounted to the back deck of a suitable seismic ship 14 with beam width B, for example with the crane beam width CB disposed between crash rails 68, and configured to provide sufficient crane travel length CT along crane rails 67 for loading and unloading the portable source storage and deployment modules 90 on each source vessel 12 in or on the back deck area of seismic ship 14. Folding ramps 82 and slipways 84 can either be lowered and deployed when loading and unloading the deployment modules 90 as shown (and for performing other service operations on source vessels 12), or ramps 82 and slipways 84 can be raised and stowed as described below.

Figure 16A:
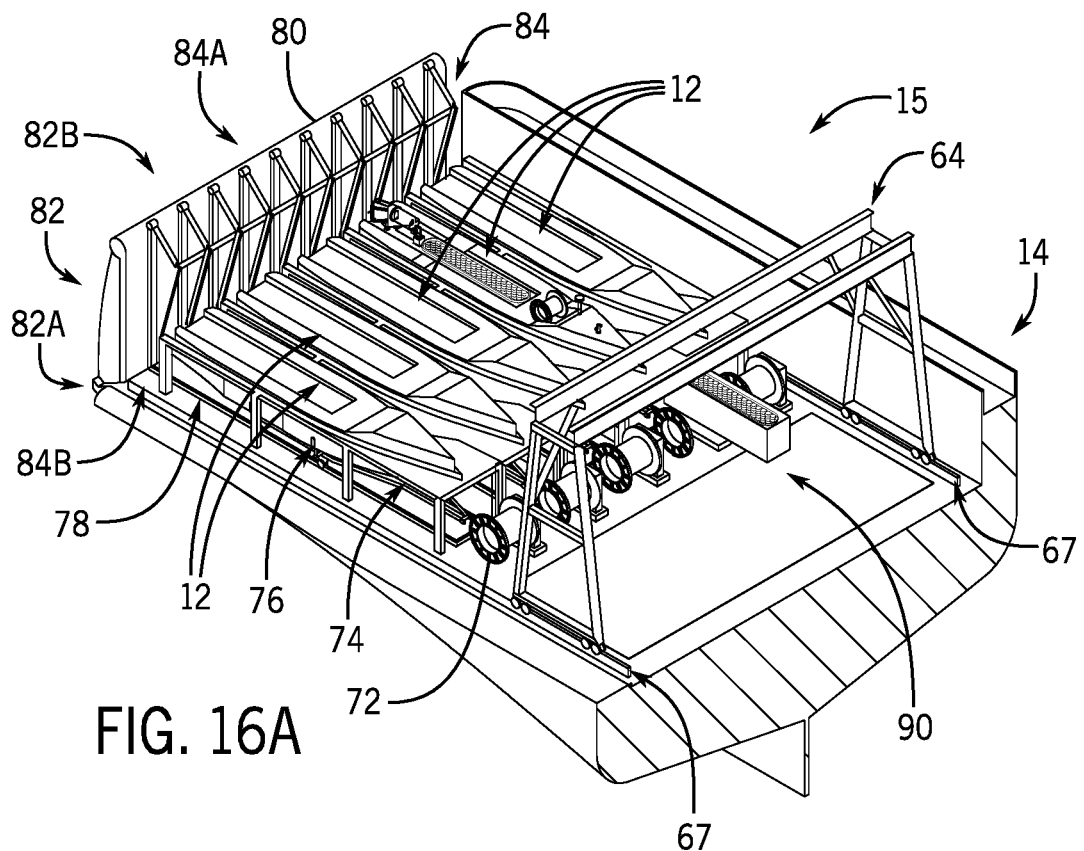
FIG. 16A is an isometric view of the ramp and slipway system, in a raised or stowed position.
Figure 16B:
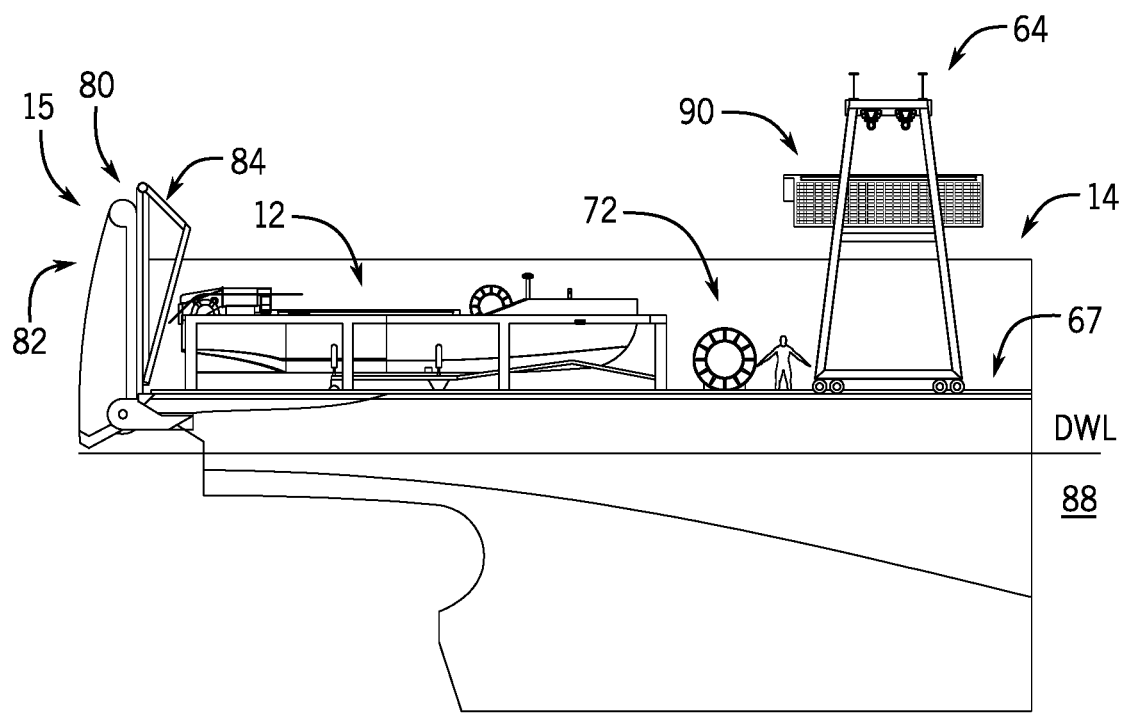
FIG. 16B is a profile view of the stowed ramp and slipway system.

FIG. 16A is a perspective view of the ramp and slipway system 80, in a raised or stowed position on the back deck of a seismic ship 14. FIG. 16B is a profile view of the stowed ramp and slipway system 80.

As shown in FIGS. 16A and 16B, source vessels 12 are disposed in docking platforms 74, e.g., positioned on rails 78 by individual carriages 76. The ramps (or ramp assembly) 82 can be folded upright, with the distal ramp end 82B disposed above the proximal ramp end 82A coupled to the back deck of the seismic ship 14. Similarly, the slipways (or slipway assembly) 84 can be folded upright against the ramp assembly 82, with the proximal slipway end 84A coupled to the distal ramp end 82B and positioned above the back deck of the seismic ship 14, with the distal slipway end 84B disposed adjacent the back deck where it couples to proximal ramp end 82A.

FIG. 17A is a plan view of ramp and slipway system 80, in the raised or stowed position. FIG. 17B is an aft view showing a representative arrangement of the gantry crane 64, and FIG. 17C is a detail view of the gantry crane 64.

As shown in FIGS. 17A-17C, gantry crane 64 can be configured to load and unload individual seismic sources 16 onto vessels 12 in portable source storage and deployment modules 90. Each module or unit 90 can be provided with a source stacker/destacker or similar loading mechanism 51, and configured for storage and retrieval of seismic sources 16 using a rack-type magazine storage system 53.

The storage systems 53 and loading mechanisms 51 are removably mounted the hull structure of each selected vessel 12 inside the storage and deployment modules 90. In some embodiments, the sources 16 can be loaded into columns or magazines which circulate on a carousel operably coupled to the magazine or rack system 53, as described above.

FIG. 18A is an isometric view illustrating an unmanned or autonomous source vessel deployment on a ramp and slipway system 80. FIG. 18B is an aft view illustrating the deployment procedure, and FIG. 18C is a section view illustrating the source vessel during deployment.

As shown in FIGS. 18A-18O, portable source storage and retrieval modules 90 can be mounted to source vessels 12 when disposed in a respective docking platform 74 (vessel position 12A). The tow winch 72 can be operated to deploy individual vessels 12 on their respective carriages 76, which travel up and down along the rails 78 from the docking platform 74 to the ramp 82 (vessel position 12B). The vessel 12 can be lowered down the ramp 82 to the slipway 84 (vessel position 12C), and deployed in the water column 88 defined by the designated water line (DWL).

Figure 19A:
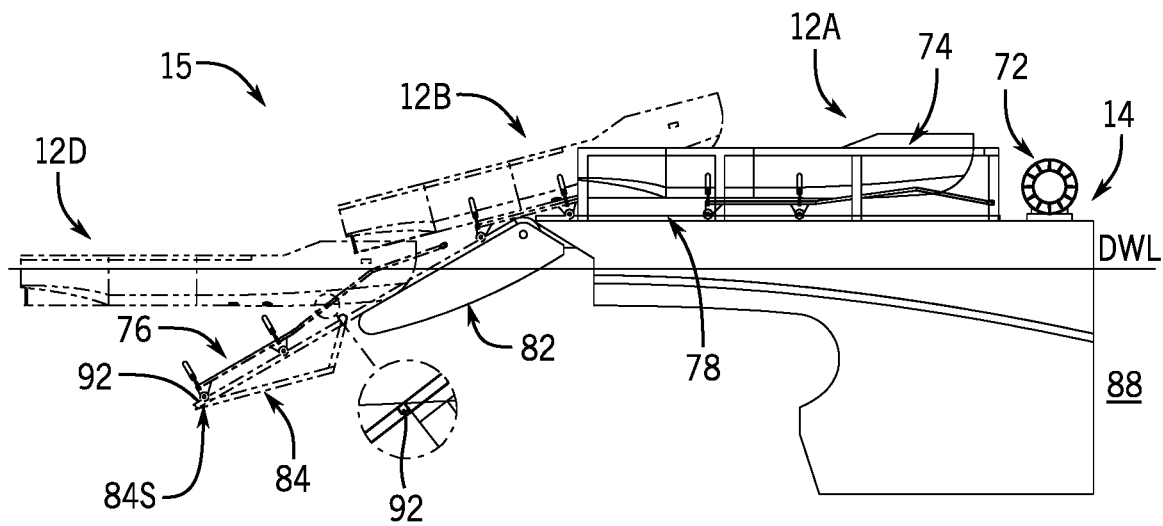
FIG. 19A is an elevation view illustrating source vessel retrieval on a ramp and slipway system.
Figure 19B:
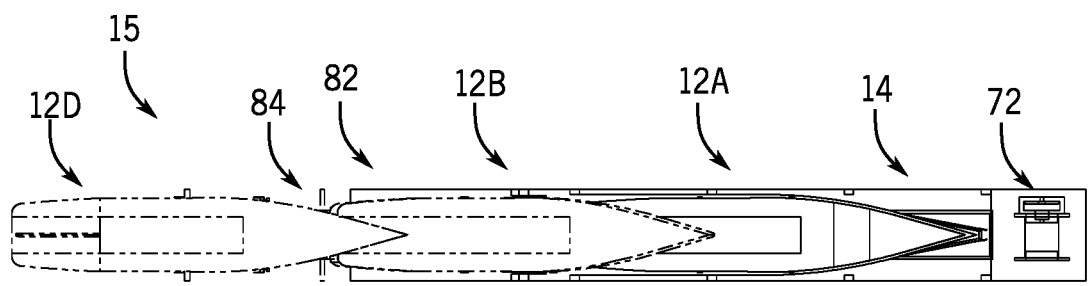
FIG. 19B is a plan view illustrating the source vessel retrieval procedure.
Figure 19C:
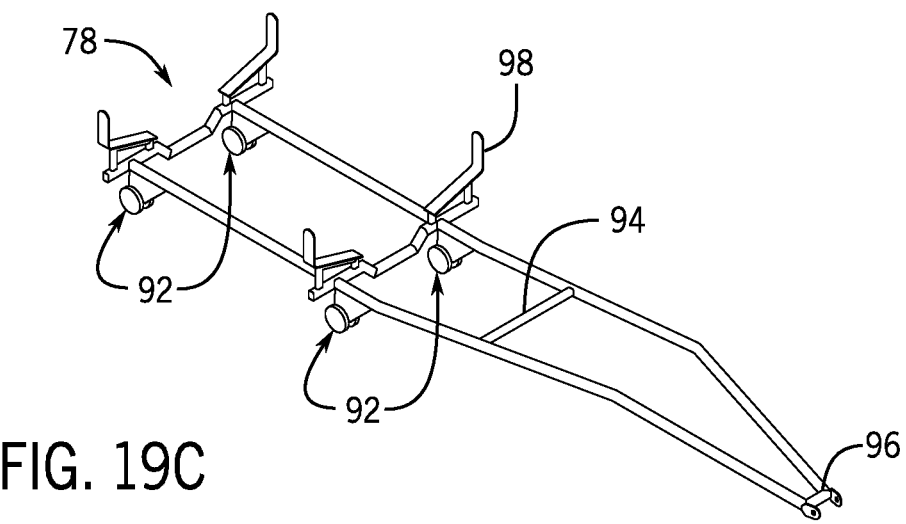
FIG. 19C is an isometric view of a carriage apparatus for deploying and retrieving an unmanned or autonomous source vessel.

FIG. 19A is an elevation view illustrating unmanned or autonomous source vessel retrieval using a ramp and slipway system 80. FIG. 19B is a plan view illustrating the retrieval procedure, and FIG. 19C is an isometric view of a carriage apparatus 76 for use when deploying and retrieving the source vessels 12.

As shown in FIGS. 19A-19O, upon deployment of the source vessel 12, the rear wheels 92 of the carriage 76 are positioned against a stop 84S on the distal (aft) end of the slipway 84. Upon retrieval, the bow or stem of the source vessel 12 docks within the slipway 84 and makes contact with the ramp 82 (position 12D), where a transverse beam component 94 of the carriage 76 can engage a protrusion or fitting on the bow or front portion of the keel of the vessel 12.

Once the vessel 12 is docked and engaged to the carriage 76 in the slipway 84 (position 12D), the vessel 12 is retrieved from the water column 88 by towing the carriage 76 and vessel 12 up the ramp 82 (position 12B). This can be accomplished, e.g., using the tow winch 72 and a rope or cable attached to a tow lug 96 on the front of the carriage 76. The carriage 76 then continues up the ramp 82 with the hull of the vessel disposed between the side guards 98, until the vessel 12 and carriage 76 are engaged in their original position within the docking station 74 (position 12A).

While references are made here to embodiments of the invention, it should be understood that the invention is not limited to the specifically described examples. Instead, any combination of the disclosed features and elements, whether related to different embodiments or not, is contemplated to implement and practice the invention. Further, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the disclosed aspects, features, embodiments and advantages are merely illustrative, and are not considered elements or limitations of the claims except where expressly recited. Likewise, reference to the invention shall not be construed as a generalization of any inventive subject matter that is disclosed, and shall not be considered to be an element or limitation of the claims except where stated therein.

EXAMPLES

In various examples and embodiments, an unmanned marine vessel may be provided comprising a hull system configured to provide buoyancy in a body of water, and one or more seismic sources configured to generate seismic energy. A deployment system can be configured to deploy the seismic source or sources from the unmanned vessel into the body of water, e.g., where the seismic energy propagates through the body of water.

In some embodiments, a compressor or other compressed air source can be provided on board the unmanned vessel, with the compressor configured for generating compressed air and a source line configured to provide the compressed air from the compressor to the seismic source or sources. Depending on example, the seismic source or sources can comprise one or more air gun systems configured to generate the seismic energy from the compressed air provided by the compressor on board the unmanned vessel.

In some embodiments, a tow line can be coupled to the unmanned vessel, e.g., to a bow of the vessel or hull system, where the tow line is configured for towing the unmanned vessel behind a tow ship, absent pneumatic or compressed air coupling between the tow ship and the vessel. A generator can be provided on board the unmanned vessel, where the generator is configured to power one or both of the compressor and the deployment system. For example, the deployment system may comprise a winch apparatus configured to pay out the source line when the seismic source is deployed from the unmanned vessel to the body of water, and/or to reel in the source line when the seismic source is retrieved from the body of water to the unmanned vessel.

In some embodiments, the hull system can comprise two or more hull sections or hull components spaced apart across a midline of the unmanned vessel, e.g., where the deployment system is configured to deploy the seismic source into the body of water along the midline, between the two or more hull sections or hull components. Alternatively or in combination, the deployment system may comprise a slipway configured to deploy the seismic source aft of the unmanned vessel, along with a source line providing compressed air for generating the seismic energy.

In some embodiments, the seismic source or sources may comprise a plurality of port air guns distributed along the source line. Alternatively or in combination, the deployment system may comprise a roller configured to deploy the air guns into the body of water aft of the slipway, and a winch apparatus configured to pay out the source line.

Suitable examples of an unmanned or autonomous vessel may also comprise one or more of a hull system configured to provide buoyancy, a seismic source configured to generate seismic energy, a deployment system configured to deploy the seismic source from the unmanned vessel into a body of water, and a compressor configured for generating compressed air. A source line can be configured to provide the compressed air from the compressor to the seismic source, e.g., where the seismic energy propagates through the body of water in the form of a seismic wavefield.

In some embodiments, the seismic source can comprise a plurality of air guns distributed coaxially along the source line. A depth sensor can be configured to determine a depth of the seismic source, e.g., where the seismic source is configured to generate the seismic energy based at least in part on the depth. Alternatively or in combination, a speed sensor can be configured to determine a speed of the unmanned vessel through the body of water, e.g., where the deployment system is configured to deploy or retrieve the seismic source based at least in part on the speed.

A vessel control system can be provided on board the unmanned or autonomous vessel, e.g., where the vessel control system is configured to operate the deployment system to deploy the seismic source or sources to the body of water. Alternatively or in combination, a global positioning system can be provided on board the unmanned or autonomous vessel, e.g., where the vessel or vessel control system is configured to autonomously operate the deployment system based at least in part on one or both of a speed and a position of the unmanned vessel as determined by the global positioning system. In autonomous operations, such control operations may be performed absent contemporaneous external command input from outside the unmanned vessel.

In some embodiments, the unmanned vessel may comprise an engine and steering system, e.g., configured for the vessel or vessel control system to autonomously navigate the unmanned vessel, e.g., based on speed and position determined by a global positioning system or other navigational system. Alternatively or in combination, the vessel or vessel control system can be configured to maintain spacing of the seismic source with respect to other source elements in a seismic source array.

In some embodiments, the unmanned or autonomous vessel may comprise a wireless interface configured for the vessel or vessel control system to communicate with an external navigational control system via radio, optical, and/or satellite communications, e.g., where the vessel or vessel control system is configured to autonomously navigate the unmanned vessel to a location identified by such an external navigational control system. Alternatively or in combination, the vessel or vessel control system can be further configured to deploy the seismic source to the water column in order to perform a seismic survey, in a location identified by a ship-based or remote (e.g., cloud-based) navigational control system.

Suitable seismic source array examples and embodiments may be provided comprising one or more unmanned vessels providing buoyancy in a water column, and one or more seismic sources deployed into the water column by each of the unmanned vessels One or more source lines can be configured to provide compressed air from the unmanned vessels to the respective seismic sources, e.g., where the seismic sources generate seismic energy from the compressed air, in the form or a seismic wavefield propagating through the water column.

In some embodiments, a tow ship can be configured to tow the one or more unmanned vessels at a tow velocity with respect to the water column, e.g., where each source line provides compressed air to the respective seismic source, absent a compressed air or umbilical connection to the tow ship. For example, each source line providing compressed air may be disposed substantially along or parallel to a direction of the tow velocity, as determined between the respective seismic sources and unmanned or autonomous vessels.

In some embodiments, a plurality of unmanned or autonomous vessels can be configured to deploy the seismic sources distributed across a width of the seismic source array. A pair or other set of diverters, paravanes, barovanes or doors can be configured to maintain lateral spacing of the seismic sources in the array, e.g., where the unmanned vessels are coupled to a tow line disposed between individual diverters, paravanes, barovanes or doors in the pair or set. Alternatively or in combination, the width of the seismic source array is configurable between about 10 meters and about 1500 meters, as defined between outermost seismic sources in the array.

In some embodiments one or more of the unmanned or autonomous vessels can comprise a winch or slipway configured to deploy the respective seismic source or sources to the water column. Alternatively or in combination, each of the seismic sources may comprise a plurality of air gun components distributed along the respective source line.

In particular embodiments, each of the seismic sources may comprise an air gun subarray deployed between twin hull components of the respective unmanned vessel. Alternatively or in combination, each of the seismic sources may be vertically supported at a depth in the water column by the buoyancy of the twin hull components, absent additional tubular float components.

Suitable marine system examples and embodiments may comprise a seismic ship or similar vessel having a back deck area, and a docking apparatus configured for deploying a plurality of unmanned or autonomous marine vessels into a body of water. Depending on embodiment, each of the unmanned or autonomous marine vessels may comprise one or more of a hull configured to provide buoyancy, a seismic source configured to generate seismic energy, a deployment system configured to deploy the seismic source into the body of water, and a source line providing compressed air to the seismic source, e.g., where the seismic energy is generated from the compressed air and propagates through the body of water in the form of a seismic wavefield. Depending on embodiment, one or more of the unmanned or autonomous marine vessels may comprise a compressor configured to generate the compressed air, e.g., where the compressed air is provided by the source line to the respective seismic sources.

In some embodiments, the docking apparatus may comprise one or more davits or cranes configured to deploy the unmanned or autonomous marine vessels, e.g., by lowering each respective hull from the back deck area into the body of water. Alternatively or in combination, the docking apparatus can be configured to deploy the unmanned or autonomous marine vessels by at least partially flooding the back deck area. Similarly, the docking apparatus may comprise a plurality of slipways disposed on a stern of the ship, e.g., with each slipway configured to deploy one or more of the unmanned or autonomous marine vessels to the body of water.

In some embodiments, the docking apparatus may comprise a plurality of docking bays configured for deployment of the unmanned or autonomous marine vessels into the body of water, and/or for retrieval therefrom. Depending on embodiment, each docking bay may comprise a lift configured to raise the hull of the respective unmanned or autonomous marine vessel from the body of water for retrieval, and/or to lower the hull into the body of water for deployment. In particular embodiments, a gantry crane can be configured to access each of the docking bays, and/or to transport the unmanned or autonomous marine vessels from the docking bays into the back deck area of the ship.

In some embodiments, the docking apparatus can be mounted to the back deck area of the seismic vessel or boat. For example, an articulated coupling can be provided between the docking apparatus and a stern of the ship, proximate the back deck area.

Suitable methods for deploying one or more seismic sources from an unmanned or autonomous vessel can be performed according to any of the above examples and embodiments. Alternatively or in combination, suitable methods for acquiring seismic data can be performed by generating seismic energy from the seismic source or sources deployed by one or more such unmanned or autonomous vessels, e.g., where the seismic energy is transmitted through a water column in the form of a seismic wavefield, and which can penetrate the ocean bed or other bottom surface and reflect from subsurface structures.

Depending on embodiment, the methods may also comprise receiving the reflected seismic energy in the wavefield, and processing the acquired wavefield energy to generate an image of the subsurface structures. A non-volatile, non-transitory computer-readable data storage medium can also be provided, e.g., with embedded program code executable by a computer system or processor to perform any of the above methods, or to operate any of the above systems to perform such a method.

A marine seismic system can be provided according to any of the above examples and embodiments, e.g., comprising a seismic ship or other seismic vessel having a back deck area and a docking apparatus configured for deploying a plurality of unmanned marine vessels from the back deck area or from the ship itself into a body of water. Depending on embodiment, each of the unmanned marine vessels may comprise one or more of a hull configured to provide buoyancy, a seismic component configured for a seismic survey, and a deployment system configured to deploy the seismic component into the body of water from the unmanned marine vessel.

The seismic component can comprise one or more seismic sources, e.g., further comprising a source line providing compressed air from the unmanned vessel to the seismic source or sources. For example, the seismic source may comprise one or more an annular port air gun subarrays distributed along the source line.

In any of the above examples and embodiments, an on-board vessel control system can be provided on one or more of the unmanned or autonomous source vessels, for example with a wireless interface configured to communicate with an external, remote or cloud-based navigational control system via radio and/or satellite communications. Depending on embodiment, the on-board vessel control system can be configured to autonomously navigate the unmanned vessel, e.g., to a location identified by the external, remote, or cloud-based navigational control system.

A marine seismic system can also be provided according to any of the above examples and embodiments, where a plurality of unmanned or autonomous marine vessels are configured to deploy a seismic source array having a deployed width of 200 meters or more, as defined between outermost seismic sources thereof. In particular embodiments, the width may be 500 meters or more.

While this invention is described with respect to exemplary embodiments, it is understood that changes can be made and equivalents may be substituted to adapt the disclosure to different materials and situations, while remaining within the spirit and scope of the invention. The invention is thus not limited to the particular examples that are described, but encompasses all the embodiments that fall within the scope of the appended claims.

The invention claimed is:

1. A vessel system comprising:
a hull configured to provide buoyancy;
a compressed air source configured to provide compressed air;
one or more seismic sources configured to generate seismic energy;
a deployment apparatus mounted on the hull, the deployment apparatus configured to deploy the one or more seismic sources from the hull to a water column, wherein the deployment apparatus comprises a slipway on which the one or more seismic sources slide to reach the water column aft of the vessel system, wherein the slipway has at least one of a V- or U-shaped cross section; and
a source line configured to provide the compressed air from the compressed air source to the one or more seismic sources deployed to the water column for generating the seismic energy to propagate through the water column.

2. The vessel system of claim 1, wherein the one or more seismic sources, when deployed to the water column, are part of a source array that includes one or more other seismic sources deployed to the water column from another vessel system, the vessel system further comprising an autonomous control system mounted on the hull and configured to maintain spacing of the one or more seismic sources with respect to the one or more other seismic sources deployed to the water column by the another vessel system.

3. The vessel system of claim 2, wherein the autonomous control system is further configured to cause the deployment apparatus to deploy the one or more seismic sources to the water column in response to arrival at a location, wherein arrival at the location is based on received positional data.

4. The vessel system of claim 3, wherein the autonomous control system is further configured to cause the hull to navigate to the location using the received positional data.

5. The vessel system of claim 3, further comprising a wireless interface configured to receive the positional data.

6. The vessel system of claim 1, wherein the hull comprises two or more hull components spaced across a midline of the vessel system, the deployment apparatus being configured to deploy the one or more seismic sources to the water column along the midline, between the two or more hull components.

7. The vessel system of claim 1, wherein the deployment apparatus further comprises a roller configured to deploy the one or more seismic sources to the water column from the slipway, and a winch configured to pay out the source line when the one or more seismic sources are deployed.

8. The vessel system of claim 1, further comprising a depth sensor configured to determine a depth of the one or more seismic sources, wherein the one or more seismic sources are configured to generate the seismic energy based at least in part on the depth.

9. The vessel system of claim 1, further comprising a speed sensor configured to determine a speed of the vessel through the water column, wherein the deployment apparatus is configured to deploy the one or more seismic sources based at least in part on the speed.

10. The vessel system of claim 1, wherein the compressed air source comprises a compressor mounted on the hull and configured to provide the compressed air to the source line.

11. The vessel system of claim 10, wherein the one or more seismic sources comprise one or more air guns configured to generate the seismic energy from the compressed air, such that the seismic energy propagates through the water column.

12. The vessel system of claim 1, further comprising a positioning system configured to provide a speed and position of the vessel system, wherein the deployment apparatus is configured to deploy the one or more seismic sources based at least in part on the speed or position.

13. The vessel system of claim 12, wherein the vessel system is self-propelled and further comprising a navigational system configured to navigate the vessel system through the water column based on the speed and position.

14. A method comprising:
positioning a tender in a desired seismic survey area; and
deploying a plurality of vessels to a water column from the tender, wherein deploying the vessels comprises:
flooding a deck area of the tender; and
positioning respective hulls of the plurality of vessels in the water column from the flooded deck area, the respective hulls configured to provide buoyancy and each of the plurality of vessels having a respective deployment system configured to deploy a respective one or more seismic sources from the respective hull to the water column;
deploying the respective one or more seismic sources of each of the plurality of vessels to the water column along a respective source line;
generating compressed air on each of the plurality of vessels, wherein the respective source line associated with each of the plurality of vessels is configured to provide the compressed air to the respective one or more seismic sources; and
generating seismic energy from the compressed air, wherein the respective one or more seismic sources associated with each of the plurality of vessels are configured to generate a seismic wavefield propagating through the water column in the form of acoustic waves.

15. The method of claim 14, further comprising, at each of the plurality of vessels:
determining a respective depth of the respective one or more seismic sources in the water column; and
generating the seismic energy from the compressed air based at least in part on the respective depth.

16. The method of claim 14, further comprising, at each of the plurality of vessels:
determining a respective speed of the respective one or more seismic sources through the water column; and
deploying the respective one or more seismic sources to the water column based at least in part on the respective speed.

17. The method of claim 14, wherein the respective one or more seismic sources comprise one or more air guns configured to generate the seismic wavefield from the compressed air.

18. A method comprising:
deploying a plurality of vessels to a water column by:
positioning the plurality of vessels with respect to one or more slipways or docking bays on a tender positioned in a desired survey area; and
lowering a respective hull of each of the plurality of vessels into the water column thereby, the respective hulls configured to provide buoyancy and wherein each of the plurality of vessels comprises a respective deployment system configured to deploy a respective one or more seismic sources from the respective hull to the water column;
deploying the respective one or more seismic sources of each of the plurality of vessels to the water column along a respective source line;
generating compressed air on each of the plurality of vessels, wherein the respective source line associated with each of the plurality of vessels is configured to provide the compressed air to the respective one or more seismic sources; and
generating seismic energy from the compressed air, wherein the respective one or more seismic sources associated with each of the plurality of vessels are configured to generate a seismic wavefield propagating through the water column in the form of acoustic waves.

19. The method of claim 18, further comprising, at each of the plurality of vessels:
determining a respective depth of the respective one or more seismic sources in the water column; and generating the seismic energy from the compressed air based at least in part on the respective depth.

20. The method of claim 18, further comprising, at each of the plurality of vessels:
   determining a respective speed of the respective one or more seismic sources through the water column; and
   deploying the respective one or more seismic sources to the water column based at least in part on the respective speed.

21. The method of claim 18, wherein the respective one or more seismic sources comprise one or more air guns configured to generate the seismic wavefield from the compressed air.

22. The method of claim 18, further comprising:
   providing, using a positioning system on each of the plurality of vessels, a speed and position of each of the plurality of vessels, wherein the respective deployment system in each of the plurality of vessels is configured to deploy the respective one or more seismic sources based at least in part on the speed or position.

23. The method of claim 14, further comprising:
   providing, using a positioning system on each of the plurality of vessels, a speed and position of each of the plurality of vessels, wherein the respective deployment system in each of the plurality of vessels is configured to deploy the respective one or more seismic sources based at least in part on the speed or position.

* * * * *